United States Patent [19]
Kurafuzi

[11] Patent Number: 4,594,625
[45] Date of Patent: Jun. 10, 1986

[54] TAPE RECORDER

[75] Inventor: Takamasa Kurafuzi, Yokohama, Japan

[73] Assignee: Tokyo Shibaura Denki Kabushiki Kaisha, Kawasaki, Japan

[21] Appl. No.: 499,144

[22] Filed: May 27, 1983

[30] Foreign Application Priority Data

Jun. 4, 1982 [JP] Japan .................................. 57-96023

[51] Int. Cl.<sup>4</sup> ............................................. G11B 15/00
[52] U.S. Cl. ..................... 360/96.3; 360/90; 360/96.1
[58] Field of Search ................... 360/96.1, 963, 93, 90, 360/69; 242/197-200

[56] References Cited

U.S. PATENT DOCUMENTS

| | | | |
|---|---|---|---|
| 4,453,189 | 6/1984 | Ida | 360/96.3 |
| 4,495,535 | 1/1985 | Kohri et al. | 360/96.3 |
| 4,531,168 | 7/1985 | Suzuki | 360/93 X |

Primary Examiner—John H. Wolff
Attorney, Agent, or Firm—Cushman, Darby & Cushman

[57] ABSTRACT

The invention relates to a tape recorder having "soft-touch" control buttons. Upon operation of first operating members for driving a tape at a normal speed, and/or second operating members for driving the tape at a high speed, a normal-speed drive mechanism and/or a high-speed drive mechanism is driven using the rotational force of a motor. When the tape is driven at high speed and the play operating member is operated so as to perform cuing or reviewing, a control mechanism holds the high-speed drive mechanism in a nonoperating state while the normal-speed drive mechanism changes from the nonoperating state to the operating state.

11 Claims, 25 Drawing Figures

TAPE RECORDER

BACKGROUND OF THE INVENTION

The present invention relates to a tape recorder and, more particularly, to a tape recorder suitable for utilizing "soft-touch" operation switches.

Various types of control buttons of a mechanical tape recorder have recently been furnished with a soft-touch operation mechanism to control tape transport functions. The soft-touch operation is performed by moving movable members, such as a head chassis, into a predetermined position by a driving force of a motor, etc. without directly moving these members by an operation force of control buttons, thus decreasing the force required to depress the control buttons.

However, soft-touch operated buttons have not been highly developed as yet, and various problems remain unsolved. For example, a conventional soft-touch operation mechanism is large and involves a high power consumption, and has thus far been limited to only a large, high-quality tape deck. A strong demand exists for the development of a compact, lightweight soft-touch control mechanism with low power consumption which may be used for a battery-operated, portable, compact cassette tape recorder such as a cassette tape recorder with a radio. Furthermore, in addition to compactness, light weight, and low power consumption, a demand also exists for smooth operation of various types of movable members in a given sequence and provision of safeguards against the exhaustion of power in the batteries.

In the tape recorder having a conventional soft touch feature, when the play button is operated in a high-speed run mode so as to permit, for example, a cue and a review, an unusally great load is applied to the motor, accelerating the dissipation of battery power contrary to the goal of low power consumption.

SUMMARY OF THE INVENTION

The present invention has been made in consideration of the above situation, and has for its object to provide a tape recorder suitable for soft-touch operation which will decrease the load imposed on a motor, and hence, decrease power consumption when a normal tape travel operation member is operated during high speed travel of the tape.

According to one aspect of the present invention, there is provided a tape recorder comprising:

a motor;

reel tables on which reel hubs with a tape wound thereon are mounted;

first operating members for driving the tape at a low speed and second operating members for driving the tape at a high speed;

a high-speed drive mechanism interlocking with said second operating members, said high-speed drive mechanism being adapted to be held in a first state during an operating state of said second operating members so as to transmit a rotational force of said motor to said reel tables, and being adapted to be held in a second state during a nonoperating state of said second operating members so as not to transmit the rotational force of said motor to said reel tables;

a low-speed drive mechanism interlocking with said first operating members, said low-speed driving mechanism being brought to an operating state by the rotational force of said motor so as to transmit the rotational force thereof to said reel tables, thereby driving the tape at the low speed; and a control mechanism for holding said high-speed drive mechanism in the second state while said low-speed drive mechanism changes from a nonoperating state to the operating state;

whereby a load imposed on said motor is decreased when said first operating members are operated while the tape is driven at the high speed.

BRIEF DESCRIPTION OF THE DRAWINGS

FIGS. 1 to 25 show a tape recorder according to an embodiment of the present invention, in which FIG. 1 is a plan view showing the overall construction of the cassette tape recorder to which the present invention is applied, FIG. 2 is a plan view showing the state wherein a main chassis is removed from the construction shown in FIG. 1, FIG. 3 shows the relationship between a normal-speed drive gear and a normal-speed drive lever, FIGS. 4 and 5 respectively show relationships between a PLAY operation board, a REC operation board, and a normal-speed lock lever, FIG. 6 is a plan view showing the relationship between a head slider, a pinch lever, and the normal-speed drive lever, FIG. 7 is a plan view for explaining the relationships of rotational force transmission among a motor, a flywheel and a right reel table, FIGS. 8 to 10 show the operating conditions of the mechanism shown in FIG. 3, FIG. 11 shows the relationship between a high-speed drive gear and a high-speed drive lever, FIGS. 12 and 13 respectively show the relationships between a REW operation board, a FF operation board and a high-speed lock lever, FIG. 14 is a plan view for explaining a rotational force transmission for tape travel, FIGS. 15 and 16 show operating conditions of the mechanism shown in FIG. 11, respectively, FIG. 17 is a plan view showing the mechanism in a FF (fast forward) mode, FIG. 18 shows the relationship between the high-speed drive gear and the high-speed lock lever in the high-speed travel mode of the tape, FIG. 19 is a plan view showing the operating condition in a REW mode, FIG. 20 shows the relationship between a PAUSE operation board and the high-speed lock lever, FIGS. 21 to 23 are plan views showing a PAUSE mode, a CUE mode and a review mode, respectively, FIG. 24 shows the relationships among an FF lever, a REW lever, a release lever, and the normal-speed drive gear, and FIG. 25 shows the operating condition of the mechanism shown in FIG. 24.

DETAILED DESCRIPTION OF THE PREFERRED EMBODIMENT

Figure 1:
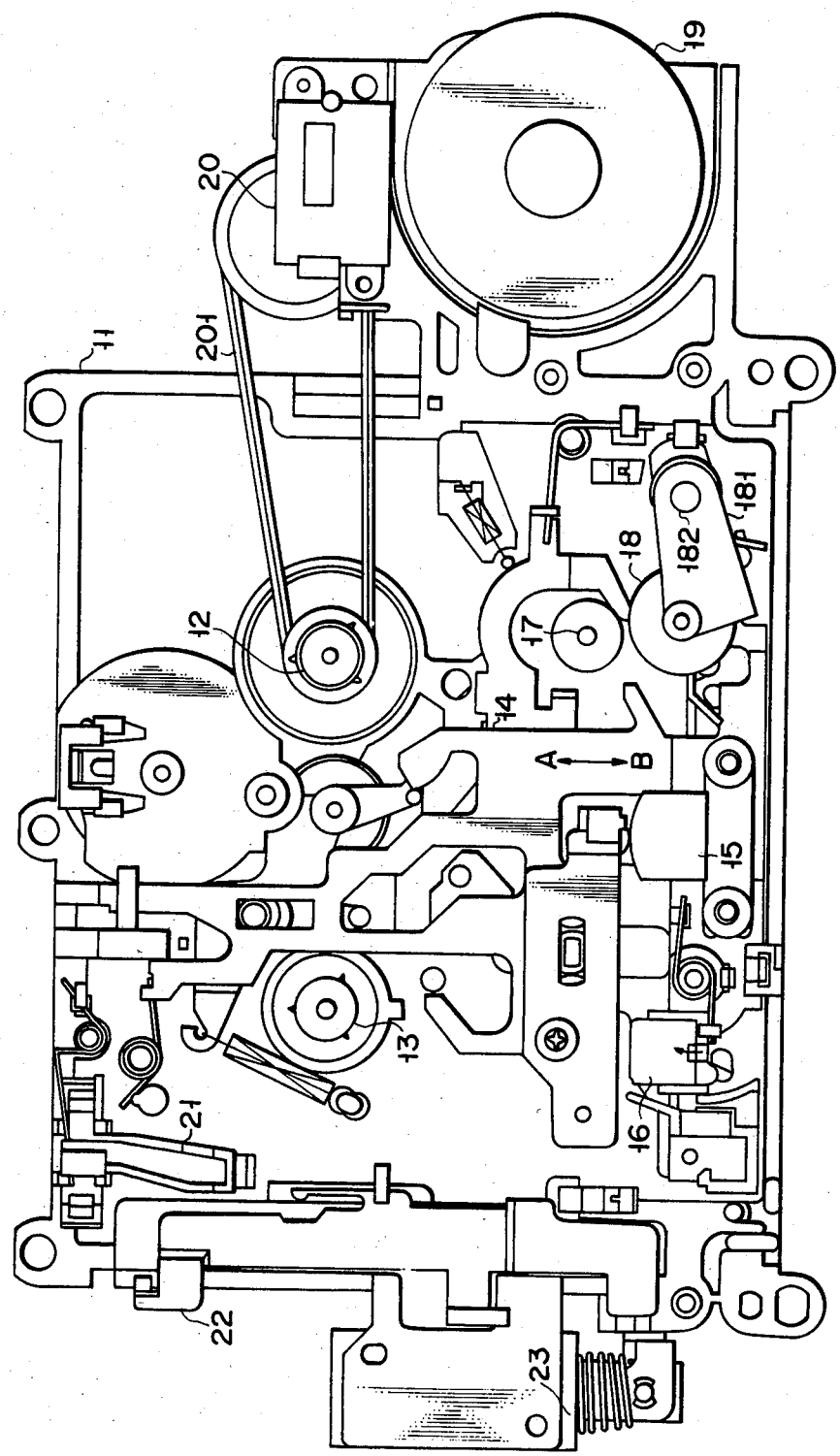
Figure 2:
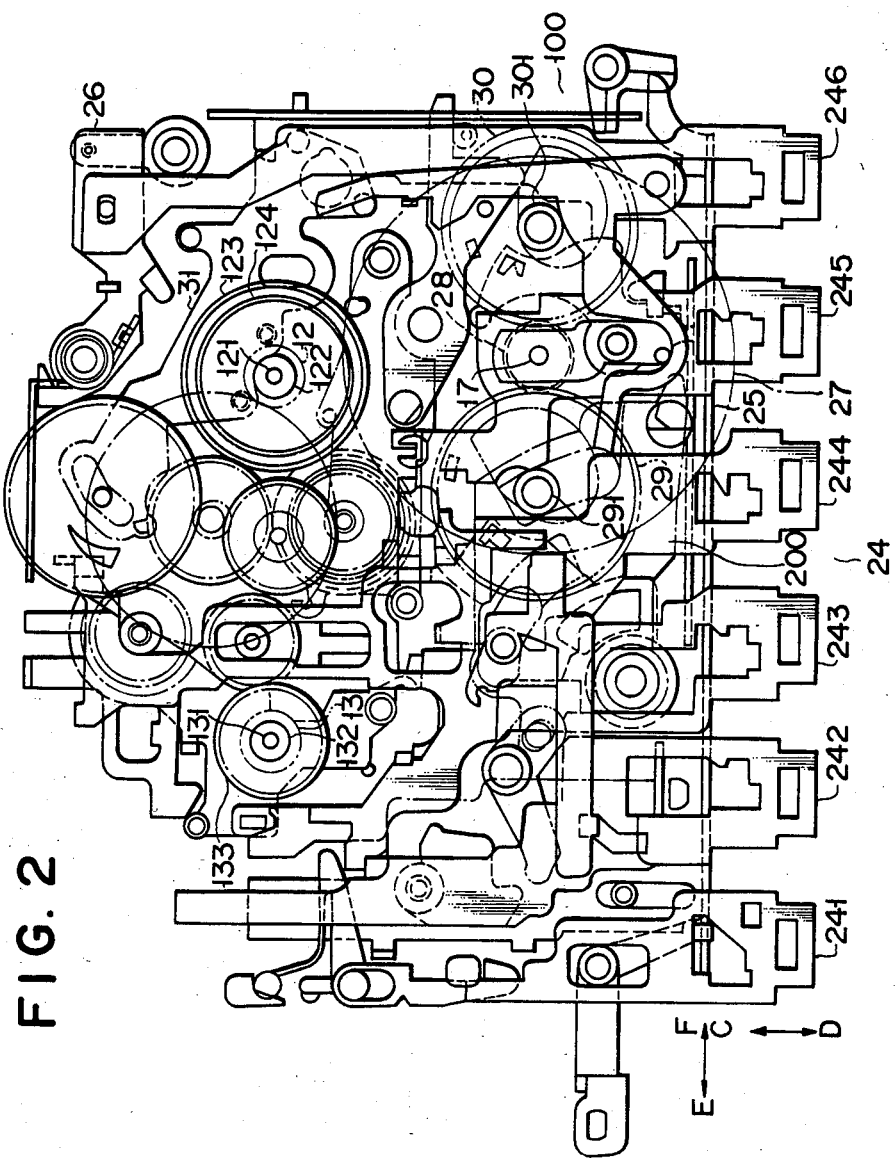

A tape recorder according to an embodiment of the present invention will be described with reference to the accompanying drawings. FIGS. 1 and 2 are a front view of a cassette tape recorder and a bottom view thereof when its main chassis is removed from the upper side.

Referring to FIG. 1, reference numeral 11 denotes a substantially box-shaped main chassis which is obtained by molding, for example, a plastic material. Right and left reel tables 12 and 13 on which a pair of reel hubs of a tape cassette (not shown) are mounted are rotatably supported at substantially the central portion of the main chassis 11. A head slider 14 is supported between the right and left reel tables 12 and 13 to be slidable in the directions indicated by arrows A and B. A recording/reproducing head (to be referred to as a record/play head hereinafter) 15 and an erase head 16 are mounted next to each other at the lower portion in FIG. 1.

A capstan 17 is rotatably supported at the lower portion (FIG. 1) of the main chassis 11. The capstan 17 serves as a rotating shaft of a flywheel (to be described later) disposed on the lower surface of the main chassis 11. A pinch roller 18 is disposed in the vicinity of the capstan 17. The pinch roller 18 is rotatably supported at one end of a pinch lever 181. Since the other end of the pinch lever 181 is fitted around a pivot pin 182 extending from the main chassis, the pinch lever 181 is pivotal about the pivot pin 182. In particular, when the pinch lever 181 pivots clockwise (FIG. 1), the pinch roller 18 is brought into tight contact with the capstan 17.

A motor 19 is disposed at the rightmost portion (FIG. 1) of the main chassis 11. A tape counter 20 is disposed at a portion of the main chassis 11 above the motor 19 and is interlocked with the right reel table 12 through a belt 201.

A known accidental erase prevention lever 21, an eject slider 22 for holding a cassette cover (not shown) at a closed position and for releasing it from the closed position and keeping it at an open position, a solenoid plunger 23 for cuing (i.e., detecting a blank portion of the tape so as to locate a desired tape position), and so on are disposed at the leftmost portion (FIG. 1) of the main chassis 11.

Referring to FIG. 2, an operation section 24 is disposed at the lower portion so as to set the cassette tape recorder in a predetermined operating mode or a stop mode. The operation section 24 has a STOP operation board 241 for the stop/eject mode, a REC operation board 242 for the record mode, a REW operation board 243 for the rewind mode, a PLAY operation board 244 for the play mode, an FF operation board 245 for the fast forward mode, and a PAUSE operation board 246 for the pause mode, arranged from left to right in the order named. These boards are supported such that they can be depressed along the direction indicated by arrow C and can be released to their initial positions along the direction indicated by arrow D. A lock plate 25 is supported on the main chassis 11 to be slidable along the directions indicated by arrows E and F and is substantially perpendicular to the operation boards 241 to 246. The REC, REW, PLAY, and FF operation boards 242 to 245 among the operation boards 241 to 246 engage the lock plate 25 when they are depressed, and are locked at their depressed positions. The STOP operation board 241 may not be locked by the lock plate 25 but engages the lock plate 25 so as to release either one or two of operation boards 242 to 245 from the locked condition. The PAUSE operation board 246 does not engage the lock plate 25 and is independently operated. The PAUSE operation plate 246 engages a known push-push mechanism 26: when the operator depresses the PAUSE button, the PAUSE board 246 is locked in the depressed position; and when the operator depresses the PAUSE button again, the PAUSE board 246 is released and returns to its unlocked position. In this state, the play mode, for example, is restarted.

The REW and FF operation boards 243 and 245 drive a high-speed drive mechanism 100 (to be described later) so as to selectively rotate the left reel table 13 or the right reel table 12 clockwise or counterclockwise (FIG. 1) at a high speed. Therefore, the magnetic tape is rewound or fast forwarded. The PLAY operation board 244 drives a low-speed drive mechanism (Since, in this case, this corresponds to a play state, it is hereinafter referred to as a normal-speed drive mechanism 200) (to be described later) to slide the head slider 14 in the direction indicated by arrow A, so that the record/play head 15 is brought into tight contact with a magnetic tape (not shown). At the same time, the pinch roller 18 is brought into tight contact with the capstan 17 through the magnetic tape. Subsequently, the right reel table 12 is rotated counterclockwise in FIG. 1 so as to allow tape travel in the play mode. The REC operation board 242 drives the normal-speed drive mechanism 200 so as to move the record/play head 15 and rotate the pinch roller 18 and the right reel table 12 in the same manner as in the play mode. A tape recorder circuit (not shown) is switched to the record mode so as to transport the magnetic tape for recording. In this case, the REC operation board 242 need not be operated together with the PLAY operation board 244, so the operator need only depress the REC button of the REC operation board 242 so as to set the record mode. The erase head 16 interlocks with the head slider 14 and is brought into tight contact with the record/play head 15 through the magnetic tape only in the record mode. In the play mode, the erase head 16 cannot be brought into contact with the magnetic tape.

As shown in FIG. 2, a flywheel 27 and a drive gear 28 are coaxially mounted on the capstan 17. The capstan 17, the flywheel 27 and the drive gear 28 rotate integrally with each other. A normal-speed drive gear 29 and a high-speed drive gear 30 are rotatably supported on rotating shafts 291 and 301, respectively, at either side of the drive gear 28. The normal- and high-speed drive gears 29 and 30 mesh with the drive gear 28 for rotation therewith. A notch (to be described later) is formed at part of each of the normal- and high-speed drive gears 29 and 30. Normally, the notches of the normal- and high-speed drive gears 29 and 30 oppose the drive gear 28, so that the normal- and high-speed drive gears 29 and 30 cannot rotate.

When a normal-speed tape travel operation board, such as the REC or PLAY operation boards 242 or 244, is operated, the normal-speed drive gear 29 meshes with the drive gear 28 and is driven thereby. Upon rotation of the normal-speed drive gear 29, the head slider 14 and the pinch roller 18 are moved to predetermined positions, so that the right reel table 12 rotates. As a result, the magnetic tape is driven at the normal speed. When a high-speed tape travel operation board such as the REW and FF operation boards 243 and 245 is operated, the high-speed drive gear 30 meshes with the drive gear 28. Upon rotation of the high-speed drive gear 30, the right reel table 12 or the left reel table 13 is selectively rotated, thereby driving the magnetic tape at a high speed. Furthermore, the high-speed drive gear 30 meshes with the drive gear 28 and rotates when the PAUSE operation board 246 is operated.

The right and left reel tables 12 and 13 are disposed such that the reel shafts 121 and 131 are fitted in cylindrical bearings 122 and 132 in the main chassis 11, respectively. A normal-speed gear 123 and FF gear 124 which are coaxially rotated integral with the right reel table 12 are overlaid and mounted on the reel table 12. A REW gear 133 is coaxial with the left reel table 13 and is mounted on the reel table 13. The REW gear 133 rotates together with the left reel table 13. Various types of gears (to be described later) may be selectively meshed with the gears 123, 124 and 133, so that the right or left reel table 12 or 13 may be driven. An automatic stop mechanism (to be referred to as an ASO mechanism) 31 is disposed in the vicinity of the right reel table 12.

Figure 3:
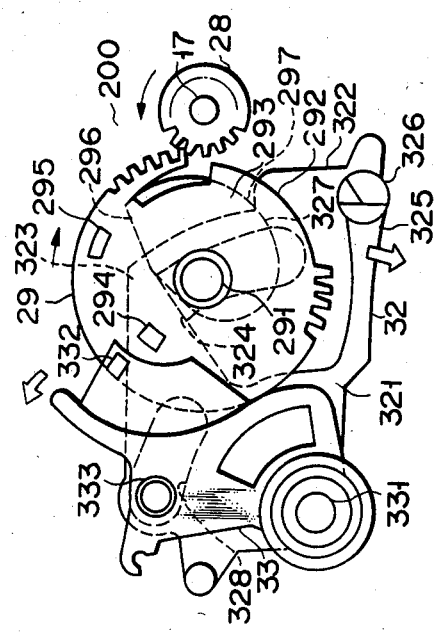

The overall structure and operation of the cassette tape recoder have been described above. A detailed description of the structure and operation of the cassette tape recorder will now follow. First, the normal-speed drive mechanism 200 will be described with reference to FIG. 3. FIG. 3 shows a detailed structure of the normal-speed drive gear 29. A notch 292, as previously described, is formed at part of the normal-speed drive gear 29 to subtend an angle of about 90° with respect to the center of the normal-speed drive gear 29. A cam 293 is formed at one side of the normal-speed drive gear 29. Two stoppers 294 and 295 are formed at the other side of the normal-speed drive gear 29. The cam 293 comprises a flat first portion 296 and an arcuated second portion 297. The stopper 294 is formed at an outer peripheral portion of the normal-speed drive gear 29, and the stopper 295 is formed at an inner peripheral portion thereof. The stoppers 294 and 295 are formed to subtend an angle of about 45° with respect to the center of the normal-speed drive gear 29.

A normal-speed drive lever 32 can engage the cam 293, and a normal-speed lock lever 33 can engage the stoppers 294 and 295. The normal-speed drive lever 32 and the normal-speed lock lever 33 are coaxially mounted on a pivot pin 331 extending on the main chassis 11, so as to pivot about the pivot pin 331. The normal-speed drive lever 32 comprises: a substantially U-shaped thick portion 321 having a proximal portion which is fitted around the pivot pin 331; and a thin portion 322 having an opening therein. The thin portion 322 opposes the cam 293. The inner surface of one arm 323 of the thick portion 321 of the normal-speed drive lever 32 constitutes an engaging portion 324 which abuts the cam 293. A drive portion 326 is formed at the distal end of the other arm 325 of the thick portion 321 so as to move the head slider 14. An elongated hole 327 is formed in the thin portion 322 so as not to prevent pivotal movement of the normal-speed drive lever 32 with respect to the rotating shaft 291 of the normal-speed drive gear 29. The normal-speed drive lever 32 is biased by a torsion spring (not shown, but described later) clockwise in FIG. 3, so that the engaging portion 324 of the arm 323 is in tight contact with the cam 293.

A lock portion 332 extends from the normal-speed lock lever 33 so as to selectively engage the stoppers 294 and 295 of the normal-speed drive gear 29, thereby preventing rotation of the normal-speed drive gear 29. The normal-speed lock lever 33 is biased clockwise (in FIG. 3) by a spring (not shown). The normal-speed lock lever 33 is pivoted clockwise (FIG. 3) until the lock portion 332 engages with the stopper 294 of the normal-speed drive gear 29. When the lock portion 332 of the normal-speed lock lever 33 is stopped by the stopper 294 of the normal-speed drive gear 29, the notch 292 of the normal-speed drive gear 29 opposes the drive gear 28. In this condition, the engaging portion 324 of the normal-speed drive lever 32 urges the first (flat) portion 296 of the cam 293, thereby biasing the normal-speed drive gear 29 clockwise in FIG. 3. However, since the lock portion 332 of the normal-speed lock lever 33 abuts against the stopper 294 of the normal-speed drive gear 29, the normal-speed drive gear 29 does not rotate and thus does not mesh with the drive gear 28.

In the above condition, when the REC or PLAY operation board 242 or 244 is operated, the lock portion 332 of the normal-speed lock lever 33 disengages from the stopper 294 of the normal-speed drive gear 29 in a manner to be described later. For this reason, the normal-speed drive gear 29 is rotated clockwise (FIG. 3) by the urging force applied through the normal-speed drive lever 32, and meshes with the drive gear 28.

Figure 4:
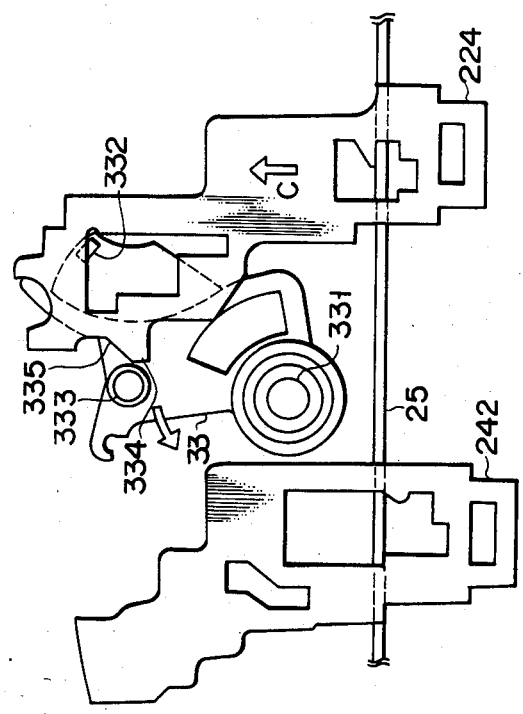
Figure 5:
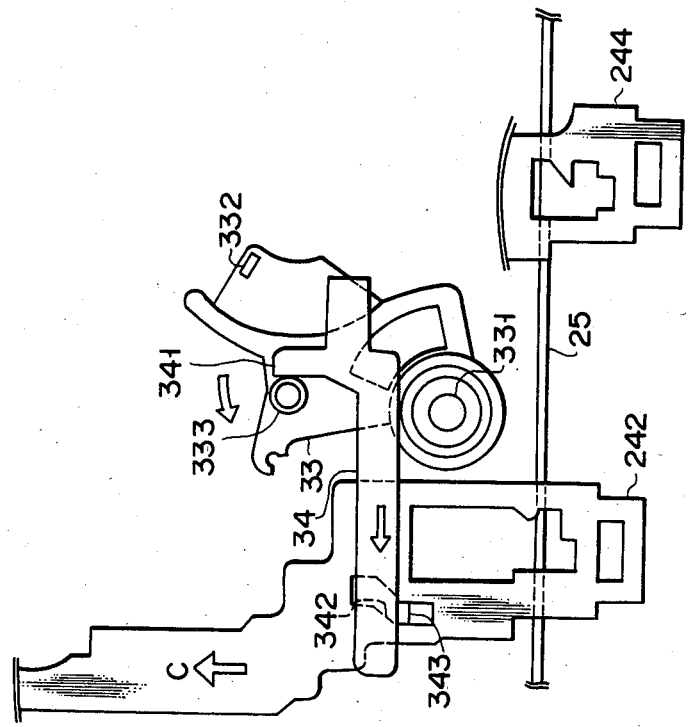

FIGS. 4 and 5 illustrate operating conditions showing the positional relationships among the PLAY operation board 244, the REC operation board 242, and the normal-speed lock lever 33. Referring to FIG. 4, a substantially columnar engaging portion 333 extends outward from the normal-speed lock lever 33. A projection 334 is formed at one side of the PLAY operation board 244 so as to engage the engaging portion 333 of the normal-speed lock lever 33. The projection 334 has a slanted portion 335 which does not interfere with the engaging portion 333 of the normal-speed lock lever 33 when the PLAY operation board 244 is moved in the direction indicated by arrow C in FIG. 4. For this reason, when the PLAY operation board 244 is operated, the engaging portion 333 is urged by the slanted portion 335, so that the normal-speed lock lever 33 is pivoted counterclockwise in FIG. 4. As a result, the lock portion 332 of the normal-lock lever 33 is released from the stopper 294 of the normal-speed drive gear 29. When the PLAY operation board 244 is locked with the lock plate 25 in the play mode, the normal-speed lock lever 33 is held at a position obtained by pivotal movement in the counterclockwise direction (FIG. 4). When the normal-speed lock lever 33 is held in this manner, the lock portion 332 is positioned in a path along which the outer surface of the stopper 295 of the normal-speed drive gear 29 rotates.

Referring to FIG. 5, the REC operation board 242 engages a REC drive slider 34 disposed in the operative direction thereof (i.e., in the direction perpendicular to the direction indicated by arrow C in FIG. 5). The REC drive slider 34 is slidably supported on the main chassis 11 and is biased by a spring (not shown) to the right in FIG. 5. An engaging portion 341 is formed at one end of the REC drive slider 34 to engage the engaging portion 333 of the normal-speed lock lever 33. A bent engaging piece 343 is formed at the other end of the REC drive slider and may be loosely fitted in a guide hole 342 formed in the REC operation board 242. The guide hole 342 of the REC operation board 242 is formed such that the REC drive slider 34 is slid to the left (FIG. 5) when the REC operation board 242 is moved along the direction indicated by arrow C (FIG. 5). For this reason, when the REC operation board 242 is moved, the REC drive slider 34 is slid to the left in FIG. 5 and the engaging portion 333 of the normal-speed lock lever 33 is urged by the engaging portion 341. As a result, the normal-speed lock lever 33 is pivoted counterclockwise in FIG. 5, and the lock portion 332 of the normal-speed lock lever 33 is disengaged from the stopper 294 of the normal-speed drive gear 29. In this state, when the REC operation board 242 is locked by the lock plate 25, the normal-speed lock lever 33 is held at a position after being pivoted counterclockwise in FIG. 5. When the normal-speed lock lever 33 is held in this manner, the lock portion 332 is positioned in a path along which the outer surface of the normal-speed drive gear 29 rotates.

The normal-speed lock lever 33 is pivoted by the same distance in both the play and record modes. An elongated hole 328 is formed in the thick portion 321 of the normal-speed drive lever 32 so as to pivot the normal-speed drive lever 32 and the normal-speed lock lever 33 without engaging the engaging portion 333 of the normal-speed lock lever 33.

Figure 6:
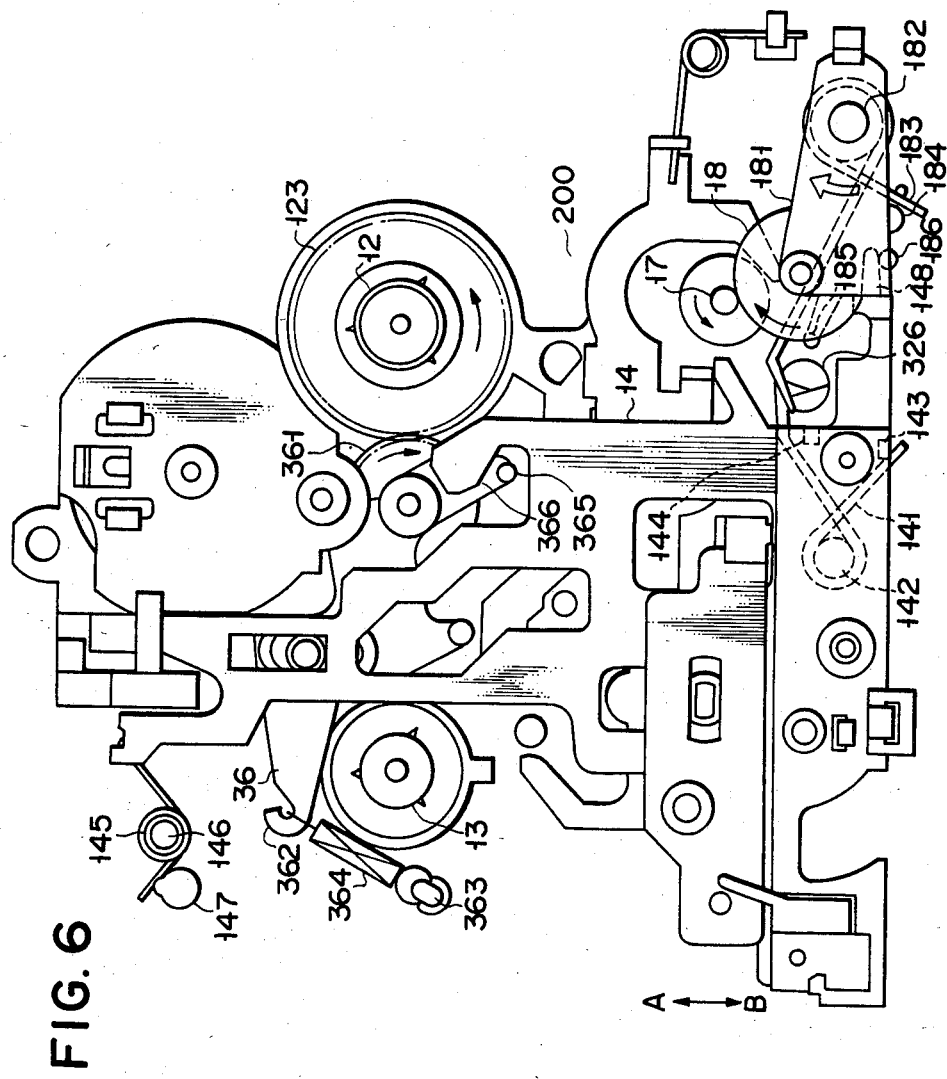

The drive portion 326 of the normal-speed drive lever 32 extends to the upper side of the main chassis through a through hole such that the drive portion 326 is loosely fitted in the through hole formed in the main chassis 11. As shown in FIG. 6, one end of a torsion spring 141 disposed on the head slider 14 engages the drive portion 326, and at the same time one end of a torsion spring 183 disposed on a pinch lever 181 engages the drive portion 326. The central portion of the torsion spring 141 is wound around a support pin 142 disposed at a portion where the record/play head 15 of the head slider 14 is mounted. The two ends of the torsion spring 141 are stopped in the stop mode by stoppers 143 and 144 formed in the head slider 14. In this condition, the torsion spring 141 does not apply any biasing force to slide the head slider 14. One end of a torsion spring 145 engages the upper portion (FIG. 6) of the head slider 14. The central portion of the torsion spring 145 is wound around a support pin 146 extending upward from the main chassis 11. The other end of the torsion spring 145 is stopped by a stopper 147 extending from the main chassis 11, so that the torsion spring 145 urges the head slider 14 in the direction indicated by arrow B. For this reason, the head slider 14 is moved in the direction indicated by arrow B (FIG. 6) in the stop mode. The one end of the torsion spring 141 urges the drive portion 326 of the normal-speed drive lever 32. As previously described with reference to FIG. 3, the normal-speed drive lever 32 is biased clockwise in FIG. 3. In other words, the normal-speed drive lever 32 is biased clockwise (FIG. 3) by the torsion spring 145.

The central portion of the torsion spring 183 is wound around a pivot pin 182 of the pinch lever 181. The two ends of the torsion spring 183 are respectively stopped by stoppers 184 and 185 extending on the pinch lever 181. The torsion spring 183 does not apply any biasing force to the pinch lever 181. An engaging portion 148 is formed at the lower right portion (FIG. 6) of the head slider 14 so as to engage a projection 186 extending downward from the pinch lever 181. Therefore, in the stop mode wherein the head slider 14 is displaced in the direction indicated by arrow B in FIG. 6, the pinch lever 181 is pivoted counterclockwise (FIG. 6) and is held at this pivoted position so as to separate the pinch roller 18 from the capstan 17.

Figure 7:
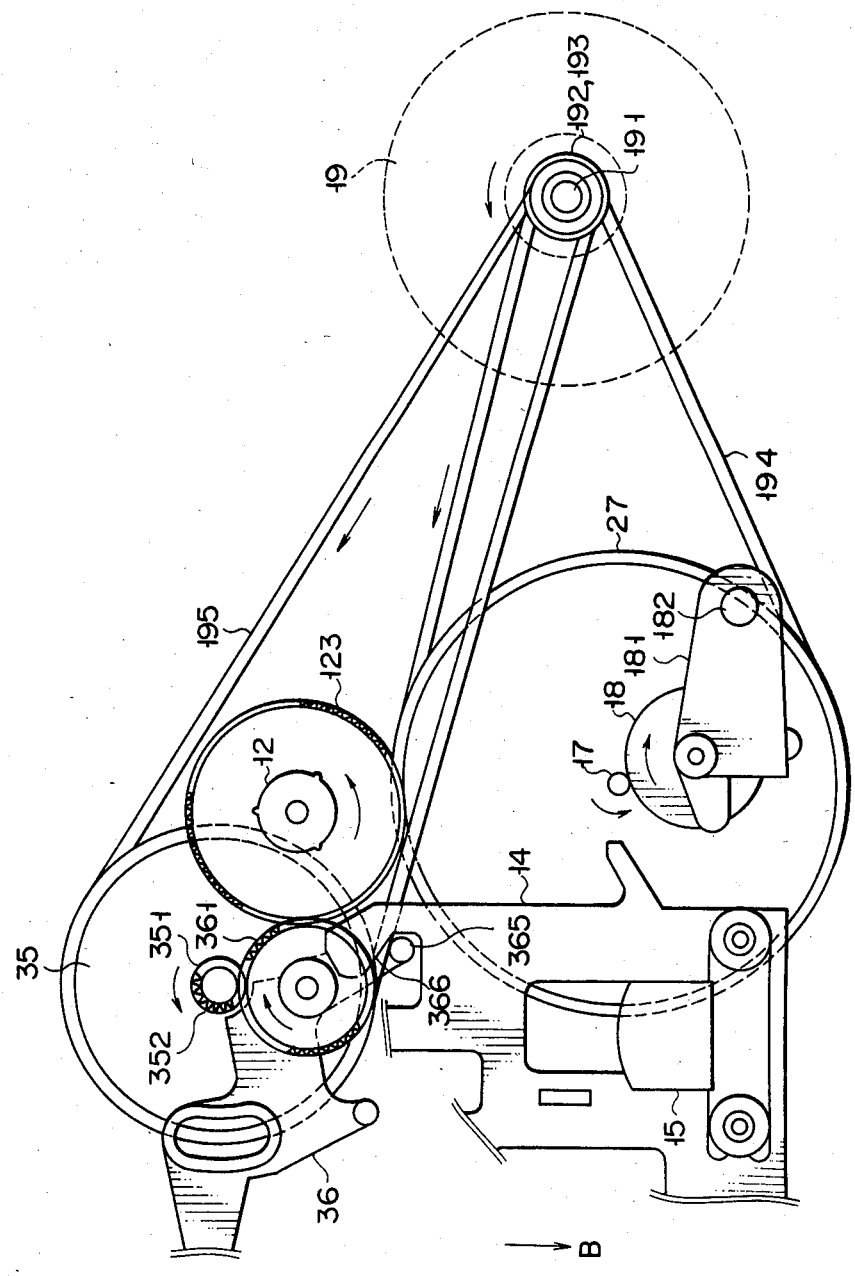

As shown in FIG. 7, motor pulleys 192 and 193 are coaxially fitted around a rotating shaft 191 of the motor 19. The motor pulley 192 is coupled to the motor 19 so as to freely transmit the rotational force of the motor 19 to the flywheel 27 through a belt 194. The motor pulley 193 is coupled to the motor 19 so as to freely transmit the rotational force of the motor 19 to a center pulley 35 through a belt 195. The center pulley 35 is rotatably supported on the main chassis 11. A center gear 351 is integrally formed with the center pulley 35 so as to be coaxial therewith. A normal-speed plate 36 is disposed in the vicinity of the center pulley 35. The normal-speed plate 36 is supported on the main chassis 11 to pivot about a rotating shaft 352 of the center pulley 35. A power transmission gear 361 is rotatably mounted on the normal-speed plate 36 and meshes with the center gear 351. The normal-speed plate 36 pivots about the rotating shaft 352 of the center pulley 35. As a result, the gear 361 constantly meshes with the gear 351 even when the normal-speed plate 36 is pivoted.

The normal-speed plate 36 is biased counterclockwise (FIG. 6) by a coil spring 364 mounted between an engaging hook 362 formed at one end of the normal-speed plate 36 and an engaging portion 363 formed on the main chassis 11. The power transmission gear 361 meshes with the normal-speed gear 123 of the right reel table 12. An engaging portion 365 extends at one end of the normal-speed plate 36. The upper end portion (FIG. 7) of the head slider 14 has an engaging portion 366 which has a tilt surface so as to engage with the engaging portion 365 from the upper to the lower side (FIG. 7). In the stop mode, since the head slider 14 is moved in the direction indicated by arrow B (FIG. 7), the engaging portion 366 of the head slider 14 urges the engaging portion 365 of the normal-speed plate 36. The normal-speed plate 36 is pivoted clockwise (FIG. 7) against the biasing force of the spring 364, so that the power transmission gear 361 is separated from the normal-speed gear 123.

As described with reference to FIG. 6, in the stop mode the head slider 14 is urged downward by the torsion spring 145 along the direction indicated by arrow B (FIG. 6). Accordingly, the pinch lever 181 is held in the position where it is pivoted counterclockwise in FIG. 6. The pinch roller 18 is thus separated from the capstan 17. At the same time, the normal-speed plate 36 is pivoted clockwise in FIG. 7, so that the power transmission gear 361 is separated from the normal-speed gear 123. In the stop mode, assume that the PLAY operation board 244 is operated so as to set the cassette tape recorder in the play mode in the manner as shown in FIG. 4. As previously described, the normal-speed lock lever 33 is pivoted counterclockwise in FIG. 4, so that the lock portion 332 of the normal-speed lock lever 33 is separated from the stopper 294 of the normal-speed drive gear 29, as shown in FIG. 3. The normal-speed drive gear 29 then meshes with the drive gear 28.

Figure 8:
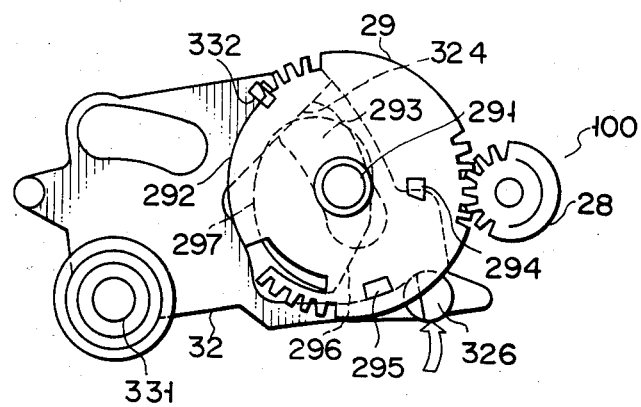

When the PLAY operation board 244 is operated, a power leaf switch is turned on through a switch slider (not shown). The motor 19 is then started, and the flywheel 27 and the center pulley 35 are rotated counterclockwise in FIG. 7. It should be noted that the power leaf switch controls the REC, REW, and FF operation boards 242, 243 and 245 in addition to the PLAY operation board 244, through the switch slider. When the flywheel 27 is rotated, the drive gear 28 is rotated counterclockwise in FIG. 3. For this reason, as shown in FIG. 8, the normal-speed drive gear 29 is rotated clockwise (FIG. 8) by the rotational force of the drive gear 28. The second, arcuated portion 297 of the cam 293 formed on the normal-speed drive gear 29 urges the engaging portion 324 of the normal-speed drive lever 32. As a result, the normal-speed drive lever 32 is pivoted counterclockwise in FIG. 8.

The drive portion 326 of the normal-speed drive lever 32 urges upward (FIG. 6) both the one end of the torsion spring 141 disposed in the head slider 14 and the one end of the torsion spring 183 disposed in the pinch lever 181. Therefore, the head slider 14 is slid against the biasing force of the torsion spring 145 in the direction indicated by arrow A in FIG. 6. The pinch lever 181 is pivoted clockwise (FIG. 6) through the torsion spring 183.

Figure 9:
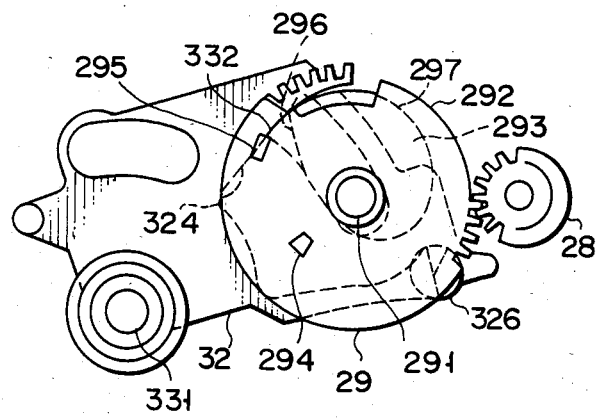

As shown in FIG. 9, when the normal-speed drive gear 29 is rotated by ¾ revolution and the notch 292 thereof is about to oppose the drive gear 28, the normal-speed drive lever 32 is pivoted counterclockwise and is held in the pivoted position.

In this case, the head slider 14 is slid in the direction indicated by arrow A in FIG. 6 until the record/play head 15 mounted on the head slider 14 is brought into proper contact with the magnetic tape at an optimum pressure in the following manner. An engaging portion (not shown) which corresponds to an optimum position of the head slider 14 is formed in the main chassis 11 and is abutted against the head slider 14. The pinch lever 181 is pivoted clockwise (FIG. 6) until the pinch roller 18 abuts the capstan 17. The stroke of the normal-speed drive lever 32 to be moved to a position shown in FIG. 9 is set to be longer than each of the strokes of the head slider 14 and the pinch lever 181. When the normal-speed drive lever 32 is pivoted to the position shown in FIG. 9, its drive portion 326 urges both the one end of the torsion spring 141 disposed on the head slider 14 and the one end of the torsion spring 183 disposed on the pinch lever 181 upward so as to separate them from the stopper 144 of the head slider 14 and the stopper 185 of the pinch lever 181, respectively. The torsion springs 141 and 183 apply biasing forces to the head slider 14 and the pinch lever 181. The head slider 14 is held by the biasing force of the torsion spring 141 in a position where the record/play head 15 is in proper contact with the magnetic tape at an optimum pressure. The pinch roller 18 is urged by the biasing force of the torsion spring 183 such that the pinch roller 18 is brought into tight contact with the capstan 17 through the magnetic tape.

In this condition, a sum of biasing forces of the torsion springs 141, 183 and 145 is applied to the normal-speed drive lever 32 through the drive portion 326. The normal-speed drive gear 29 is slightly rotated clockwise (FIG. 9) by the rotational force of the drive gear 28 from the position shown in FIG. 9. As a result, as shown in FIG. 10, the engaging portion 324 of the normal-speed drive lever 32 opposes a boundary between the first (flat) and second (arcuated) portions 296 and 297 of the cam 293 of the normal-speed drive gear 29.

As previously described, when the normal-speed drive gear 29 is positioned as shown in FIG. 9, the sum of the biasing forces of the torsion springs 141, 183 and 145 is applied to the normal-speed drive lever 32 and is transmitted to the rotating shaft 291 through the cam 293. Before the normal-speed drive gear 29 is positioned as shown in FIG. 9 (i.e., the drive gear 29 is being rotated), the biasing force applied to the normal-speed drive lever 32 is applied to the cam 293. Although the normal-speed drive gear 29 is biased at the position shown in FIG. 8 so as to rotate counterclockwise, the normal-speed drive gear 29 is rotated clockwise (FIG. 8) by the rotating force of the drive gear 28 against the biasing force applied to the normal-speed drive lever 32. However, the cam 293 receives the biasing force applied to the normal-speed drive lever 32 when the normal-speed drive gear 29 is positioned as shown in FIG. 9, so that the normal-speed drive gear 29 is biased to rotate clockwise (FIG. 10). The shape of the cam 293 and the position of the rotating shaft 291 are determined so as to perform the above operation.

Figure 10:
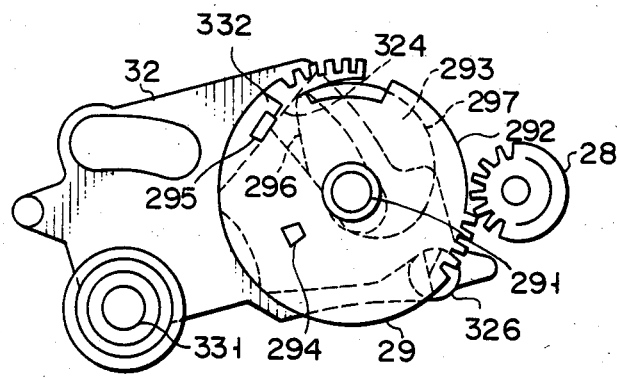

In the condition shown in FIG. 10, the normal-speed drive gear 29 is biased so as to rotate clockwise. However, since the stopper 295 of the normal-speed drive gear 29 is stopped by the lock portion 332 of the normal-speed lock lever 33, the normal-speed drive gear 29 may not rotate. As a result, the normal-speed drive gear 29 and the normal-speed drive lever 32 are securely held at the respective positions shown in FIG. 10. In this condition, the notch 292 of the normal-speed drive gear 29 completely opposes the drive gear 28, so that the driving force from the drive gear 28 is not transmitted to the normal-speed drive gear 29. Therefore, the head slider 14 and the pinch roller 18 are properly held at the respective positions shown in FIG. 6.

When the head slider 14 is slid in the direction indicated by arrow A, the engaging portion 366 thereof is separated from the engaging portion 365 of the normal-speed plate 36. The normal-speed plate 36 is pivoted counterclockwise (FIG. 6) by the biasing force of the spring 364. As shown in FIG. 7, the transmission gear 361 meshes with the normal-speed gear 123, so that the rotational force of the motor 19 is transmitted to the right reel table 12 through the motor pulley 193, the belt 195, the center pulley 35, the center gear 351, the transmission gear 361, and the normal-speed gear 123. As a result, the right reel table 12 is rotated counterclockwise in FIG. 7 and the magnetic tape travels in the play mode direction.

When the STOP operation board 241 is operated in the play mode, the PLAY operation board 244 locked by the lock plate 25 is released. The PLAY operation board 244 is slid downward in FIG. 4 and returns to the nonoperative position. In this condition, the normal-speed lock lever 33 is pivoted clockwise in FIG. 4 and returns to the nonoperative position. For this reason, as shown in FIG. 10, the lock portion 332 of the normal-speed lock lever 33 which has been stopped by the stopper 295 of the normal-speed drive gear 29 is separated from the stopper 295. Since the normal-speed drive gear 29 is biased clockwise in FIG. 10 through the normal-speed drive lever 32, the normal-speed drive gear 29 is rotated clockwise in FIG. 1 until the stopper 294 thereof is stopped by the lock portion 332 of the normal-speed lock lever 33.

In this manner, the normal-speed drive gear 29 returns to the (nonoperative) stop position. Upon this movement, the normal-speed drive lever 32 is pivoted clockwise and is held in the initial position as shown in FIG. 10. The head slider 14 is slid along the direction indicated by arrow B (FIG. 6) and the pinch lever 181 is rotated counterclockwise (FIG. 6). Upon movement of the head slider 14 and the pinch lever 181, the normal-speed plate 36 is pivoted clockwise in FIG. 7. The record/play head 15 is separated from the tape, so that the pinch roller 18 is separated from the capstan 17. At the same time, the transmission gear 361 is separated from the normal-speed gear 123, thereby setting the stop mode.

Assume that the REC operation board 242 is moved in the condition shown in FIG. 5 so as to change the operating mode of the tape recorder from the stop mode to the record mode. As previously described, the normal-speed lock lever 33 is pivoted counterclockwise (FIG. 5). The head slider 14 and the pinch roller 18 are kept in their predetermined positions (FIG. 6) in the same manner as in the play mode. At the same time, the transmission gear 361 meshes with the normal-speed gear 123, thereby driving the magnetic tape.

In the record mode, when the STOP operation board 241 is operated, the REC operation board 242 locked by the lock plate 25 is released, as shown in FIG. 5. The REC operation plate 242 is slid downward (FIG. 5) and returns to the nonoperative position. The REC drive slider 34 is then slid to the right (FIG. 5), and the normal-speed lock lever 33 is pivoted clockwise (FIG. 5). As previously described, the head slider 14, the pinch lever 181, the normal-speed plate 36 and the like return to their respective initial positions. As a result, the stop mode is set.

Figure 11:
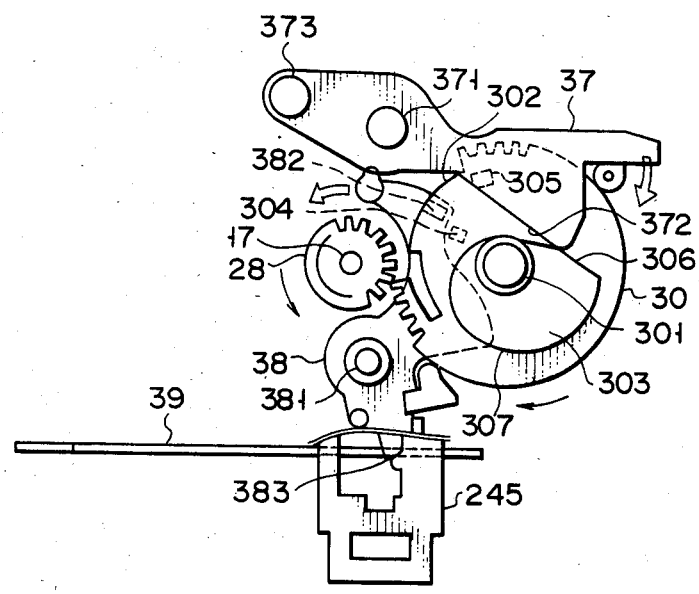

The high-speed drive mechanism 100 will now be described with reference to FIG. 11. FIG. 11 shows a detailed construction of the high-speed drive gear 30. A notch 302 is formed at part of the periphery of the high-speed drive gear 30, to subtend an angle of about 90° with respect to the center thereof. A cam 303 is formed at one surface portion of the high-speed drive gear 30, and two stoppers 304 and 305 extend from the other surface portion thereof. The cam 303 has a flat first portion 306 and an arcuated second portion 307. The stopper 304 is formed in an inner portion of the surface area of the high-speed drive gear 30, and the stopper 305 is formed in an outer portion of the surface area thereof. The stoppers 304 and 305 are formed to have an angular interval of about 45° therebetween.

A high-speed drive lever 37 and a high-speed lock lever 38 engage the cam 303 and one of the stoppers 304 and 305, respectively. Substantially the center of the high-speed drive lever 37 is pivotal about a pivot pin 371 extending from the main chassis 11. An engaging portion 372 is formed at one end of the high-speed drive lever 37 so as to abut the cam 303 of the high-speed drive gear 30. A columnar drive portion 373 is formed at the other end of the high-speed drive lever 37 so as to engage a control lever to be described later. The high-speed drive lever 37 is biased so as to pivot clockwise in FIG. 11, and the engaging portion 372 thereof is brought into tight contact with the cam 303.

Substantially the center of the high-speed lock lever 38 is supported to be pivotal about a pivot pin 381 extending from the main chassis. A lock portion 382 is formed at one end of the high-speed lock lever 38 so as to selectively engage the stopper 304 or 305 of the high-speed drive gear 30, thereby preventing rotation of the high-speed drive gear 30. The high-speed lock lever 38 is biased by a spring (not shown) so as to pivot clockwise in FIG. 11. The high-speed lock lever 38 is pivoted clockwise (FIG. 11) until its lock portion 382 engages the stopper 304 of the high-speed drive gear 30. In the condition wherein the lock portion 382 of the high-speed lock lever 38 engages the stopper 304, the notch 302 of the high-speed drive gear 30 opposes the drive gear 28. In this case, the engaging portion 372 of the high-speed drive lever 37 urges the first, flat portion 306 of the cam 303, thereby biasing the high-speed drive gear 30 clockwise in FIG. 11. However, since the lock portion 382 of the high-speed lock lever 38 engages the stopper 304 of the high-speed lock lever 38, the high-speed drive gear 30 neither meshes with nor is rotated by the drive gear 28.

An engaging piece 383 is formed at the other end of the high-speed lock lever 38 so as to engage with a high-speed drive slider 39. The high-speed drive slider 39 is disposed parallel to the lock plate 25 and is supported on the main chassis 11 so as to slide in the horizontal direction (FIG. 11). The high-speed drive slider 39 is biased to the left (in FIG. 11) by a spring (not shown). As will be described later, the high-speed drive slider 39 is slid to the right (FIG. 11) against the biasing force of the spring so as to interlock with the REW or FF operation board 243 or 245. When the high-speed drive slider 39 is slid to the right (FIG. 11), the high-speed drive slider 39 urges the engaging piece 383 of the high-speed lock lever 38 in the same direction. The high-speed lock lever 38 is then pivoted counterclockwise in FIG. 11. The lock portion 382 of the high-speed lock lever 38 is separated from the stopper 304 of the high-speed drive gear 30. The high-speed drive gear 30 is then rotated clockwise (FIG. 11) by the biasing force applied through the high-speed drive lever 37. As a result, the high-speed drive gear 30 meshes with the drive gear 28.

Figure 12:
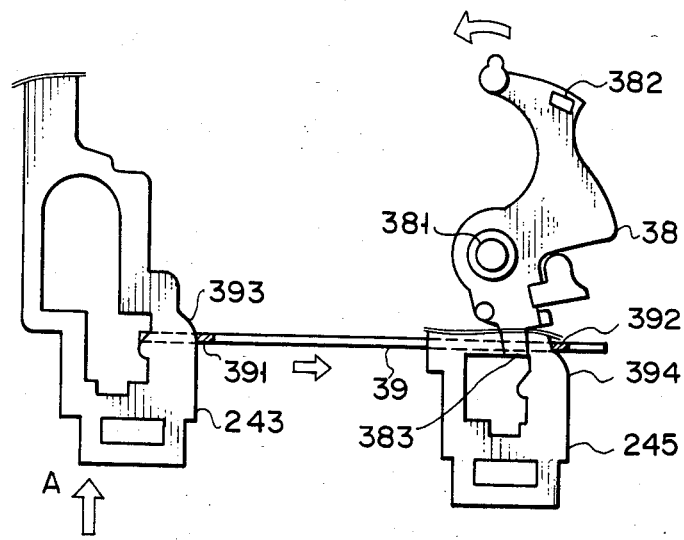

FIG. 12 shows the relationships between the REW and FF operation boards 243 and 245 and the high-speed drive slider 39. In particular, engaging pieces 391 and 392 respectively corresponding to the REW and FF operation boards 243 and 245 are formed in the high-speed drive slider 39. Each of tilt portions 393 and 394 is formed at a corresponding one of the REW and FF operation boards 243 and 245 so as to urge each of the engaging pieces 391 and 392 of the high-speed drive slider 39 in the condition wherein the REW and FF operation boards 243 and 245 are simultaneously moved in the direction indicated by arrow A (FIG. 12), thereby sliding the high-speed drive slider 39 to the right (FIG. 12). When the REW operation board 243 is operated as shown in FIG. 12, the engaging piece 391 of the high-speed drive slider 39 is urged by the tilt portion 393. The high-speed drive slider 39 is slid to the right (FIG. 12). Upon movement of the high-speed drive slider 39, the high-speed lock lever 38 is pivoted counterclockwise (FIG. 12). As a result, the lock portion 382 of the high-speed lock lever 38 is separated from the stopper 304 of the high-speed drive gear 30. When the REW operation board 243 is locked by the lock plate 25 in the rewind mode, the high-speed lock lever 38 is pivoted counterclockwise (FIG. 11) and is held at the pivoted position. In the position where the high-speed lock lever 38 is locked, its lock portion 382 is positioned in a path along which the outer surface of the stopper 305 of the high-speed drive gear 30 is pivoted.

Figure 13:
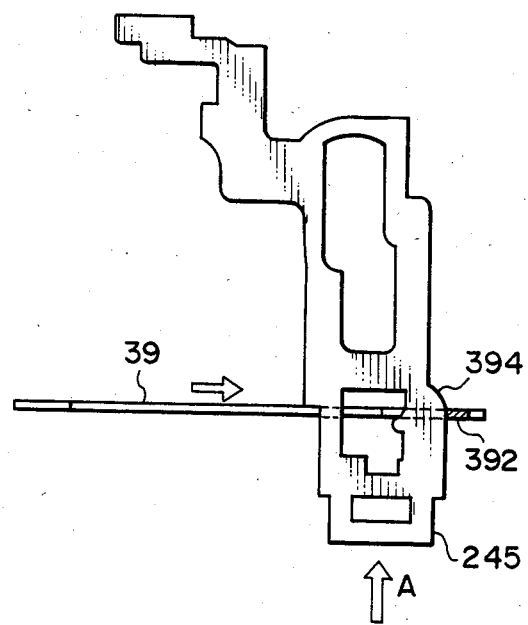

As shown in FIG. 13, when the FF operation board 245 is moved in the direction indicated by arrow A, the tilt portion 394 urges the engaging piece 392 of the high-speed drive slider 39. The high-speed slider 39 is then slid to the right (FIG. 13). The high-speed lock lever 38 is pivoted counterclockwise (FIG. 11), thereby separating the lock portion 382 of the high-speed lock lever 38 from the stopper 304 of the high-speed drive gear 30. When the lock plate 25 is locked while the FF operation board 245 is shifted in the operative condition, the high-speed lock lever 38 is held at the pivoted position (counterclockwise in FIG. 11). In this position, the lock portion 382 is positioned in a path along which the outer surface of the stopper 305 of the high-speed drive gear 30 is pivoted. The high-speed lock lever 38 is pivoted by the same distance in both the rewind and fast forward modes.

The columnar drive portion 373 of the high-speed drive lever 37 extends to the upper surface of the main chassis 11 through a through hole (not shown) formed in the main chassis 11. The columnar drive portion 373 is loosely fitted in this through hole. As shown in FIG.

Figure 14:
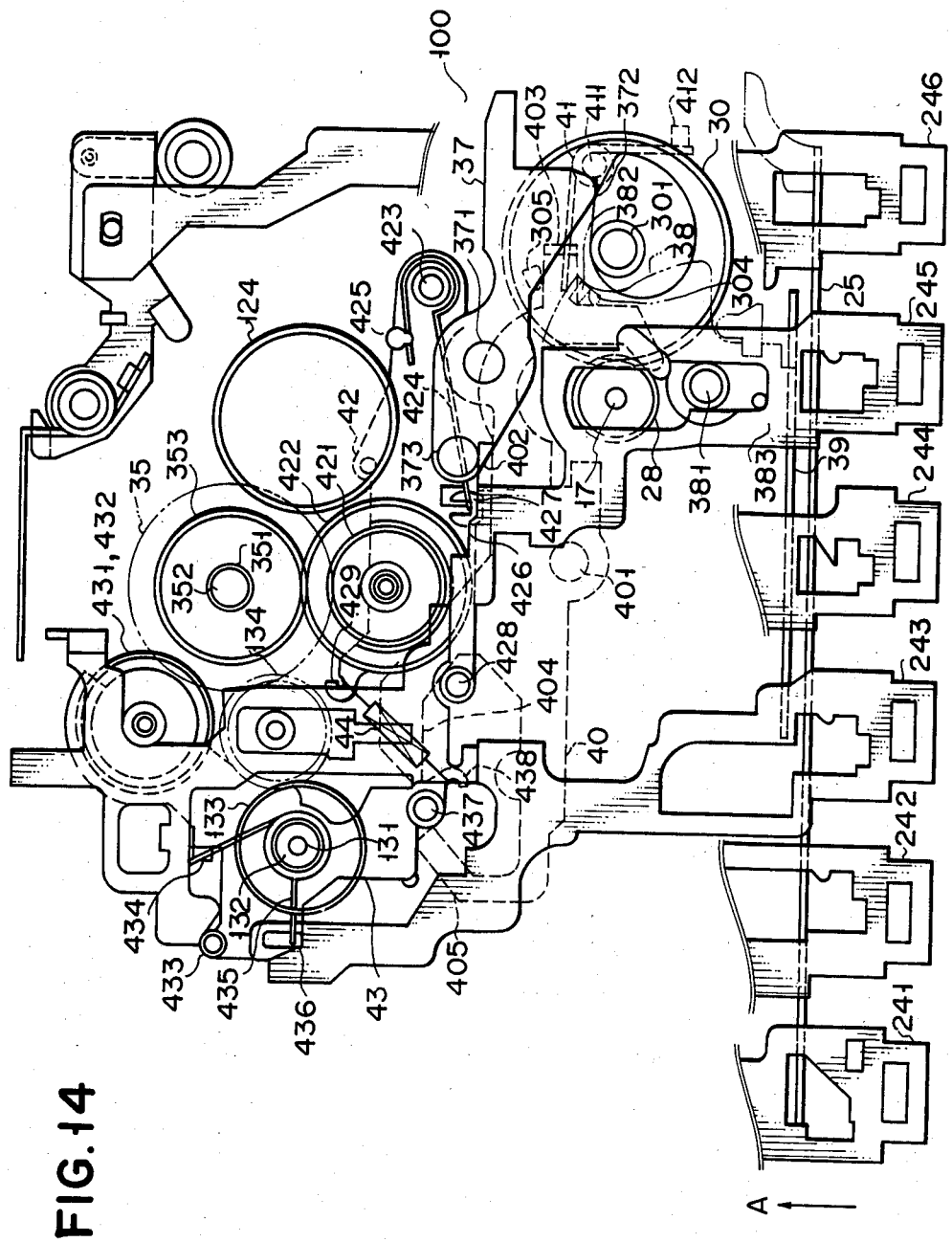

14, the columnar drive portion 373 engages one side of the control lever (indicated by the dotted line in FIG. 14). Substantially the center of a control lever 40 is supported to be pivotal about a pivot pin 401 disposed on the main chassis 11. A bent engaging piece 402 is formed at the upper portion (FIG. 14) of the control lever 40 so as to abut the columnar drive portion 373 of the high-speed drive lever 37. A bent stopper 403 is formed at the rightmost portion (FIG. 14) of the control lever 40 so as to stop one end of a torsion spring 41. The central portion of the torsion spring 41 is wound around a support shaft 411 extending from the main chassis 11, and the other end of the torsion spring 41 is stopped by a stopper 412 extending from the main chassis 11. The control lever 40 is thus biased to pivot counterclockwise (FIG. 14). The control lever 40 can actually be pivoted to a position shown in FIG. 14.

As shown in FIG. 14, a high-speed gear 353 is mounted on the center pulley 35. The high-speed gear 353 is coaxially disposed outside the center gear 351 and is rotated together therewith. Transmission gears 421 and 422 are rotatably supported at one end of an FF lever 42. The transmission gear 421 coaxially overlays the transmission gear 422 and is rotated together therewith. The transmission gear 421 can be meshed with the high-speed gear 353, and the transmission gear 422 can be meshed with the FF gear 124. The other end of the FF lever 42 is fitted around a pivot pin 423 extending from the main chassis 11 to be pivotal thereabout. When the FF lever 42 is pivoted clockwise (FIG. 14), the transmission gears 421 and 422 mesh with the high-speed gear 353 and the FF gear 124, respectively.

The central portion of a torsion spring 424 is wound around the pivot pin 423 of the FF lever 42. The two ends of the torsion spring 424 are stopped by stoppers 425 and 426, respectively, of the FF lever 42. In this condition, the torsion spring 424 does not apply any biasing force to the FF lever 42. An engaging portion 427 is formed at the upper end portion (FIG. 14) of the FF operation board 245 so as to be engageable with the end of the torsion spring 424 which is stopped by the stopper 426 of the FF lever 42. When the FF operation board 245 is held in the nonoperative position, the engaging portion 427 is set in a position spaced slightly apart and downward (FIG. 14) from the end of the torsion spring 424. A substantially columnar control portion 428 extends from the other end of the FF lever 42. The control portion 428 can engage an inner side of an arcuated first arm 404 (of first and second arcuated arms 404 and 405) formed at the other end of the control lever 40.

A reverse-rotation gear 134 rotatably supported on the main chassis 11 meshes with the REW gear 133 of the left reel table 13. Transmission gears 431 and 432 are rotatably supported at one end of a REW lever 43 above (FIG. 14) the reverse-rotation gear 134. The diameter of the transmission gear 431 is substantially the same as that of the transmission gear 432, and these gears 431 and 432 are coaxial and rotate together. The transmission gear 431 can be meshed with the high-speed gear 353, and the transmission gear 432 can be meshed with the reverse-rotation gear 134. Substantially the center of the REW lever 43 is supported on the main chassis 11 so as to be pivotal about the reel shaft 131 of the left reel table 13. When the REW lever 43 is pivoted clockwise (FIG. 14), the transmission gears 431 and 432 mesh with the high-speed gear 353 and the reverse-rotation gear 134, respectively.

Substantially the center of the torsion spring 433 is wound around the bearing 132 of the left reel table 13. The two ends of the torsion spring 433 are stopped by stoppers 434 and 435 formed on the REW lever 43. The torsion spring 433 does not apply any biasing force to the REW lever 43. An engaging portion 436 is formed in the upper end portion (FIG. 14) of the REW operation board 243 so as to be engageable with the end of the torsion spring 433 which can be stopped by the stopper 435. When the REW operation board 243 is located in the nonoperative position, the engaging portion 436 is set at a position slightly separated and downward (FIG. 14) from the end of the torsion spring 433. A substantially columnar control portion 437 extends from the other end of the REW lever 43. The control portion 437 can engage the inner side of the second arm 405 of the control lever 40.

A hook 429 is formed at the other end of the FF lever 42. Similarly, a hook 438 is formed at the other end of the REW lever 43. A coil spring 44 is mounted between the hooks 429 and 438. Although the FF lever 42 and the REW lever 43 are biased counterclockwise (FIG. 14), they only pivot until they reach the positions shown in FIG. 14.

Assume that the FF operation board 245 is moved in the direction indicated by arrow A (FIG. 14) so as to set the tape recorder in the fast forward mode. The engaging portion 427 of the FF operation board 245 urges (FIG. 14) the end of the torsion spring 424 of the FF lever 42 upward. In this condition, since the control portion 428 of the FF lever 42 is stopped at the inner side of the first arm 404, the FF lever 42 is not pivoted clockwise in FIG. 14. However, since the FF operation board 245 is sufficiently slid in the direction indicated by arrow A, the end of the torsion spring 424 is urged upward by the engaging portion 427, thereby separating the FF operation board 245 from the stopper 426 of the FF lever 42. As a result, the torsion spring 424 applies a biasing force to the FF lever 42 to pivot it clockwise (FIG. 14).

Figure 16:
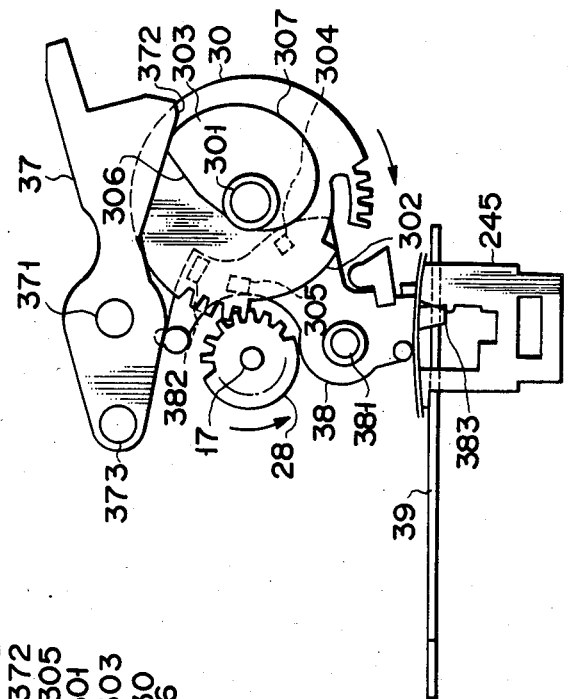
Figure 15:
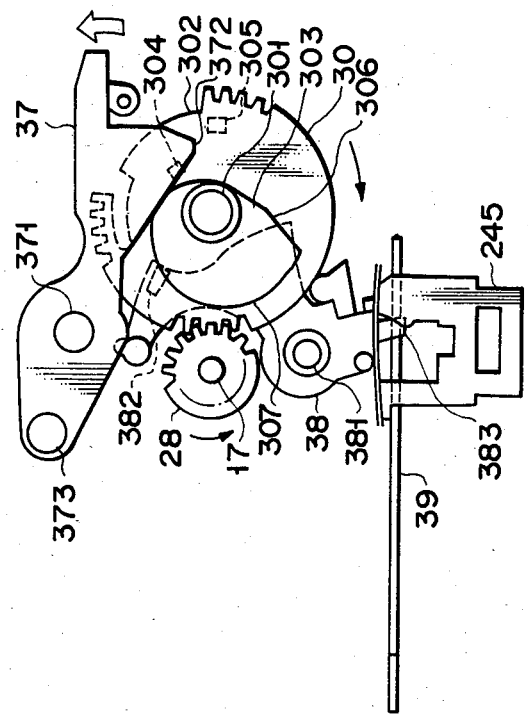

When the FF operation board 245 is moved in the direction indicated by arrow A, the lock portion 382 of the high-speed lock lever 38 is disengaged from the stopper 304 of the high-speed drive gear 30. The high-speed drive gear 30 then meshes with the drive gear 28. Upon movement of the FF operation board 245, the leaf power switch is turned on, so that the motor 19 is rotated and the drive gear 28 is driven counterclockwise in FIG. 11. The high-speed drive gear 30 is rotated clockwise (FIG. 11) by the rotational force of the drive gear 28. As shown in FIGS. 15 and 16, the second portion 307 of the cam 303 urges the engaging portion 372 of the high-speed drive lever 37, thereby pivoting the high-speed drive lever 37 counterclockwise (FIG. 16).

Figure 17:
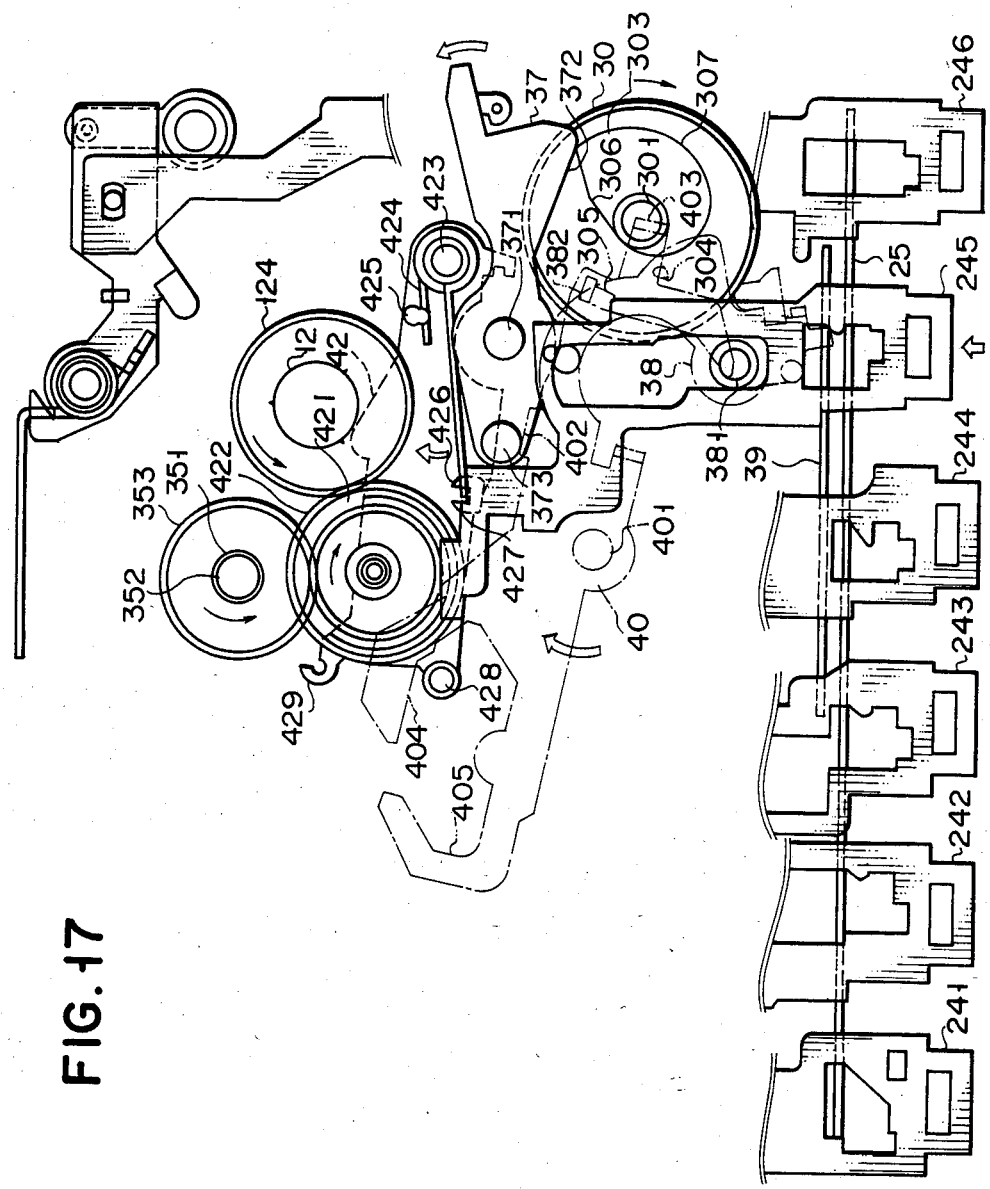

As shown in FIG. 17, the columnar drive portion 373 of the high-speed drive lever 37 urges the bent engaging piece 402 of the control lever 40, thereby pivoting the control lever 40 clockwise (FIG. 17) against the biasing force of the torsion spring 41. The control portion 428 of the FF lever 42 is released from the first arm 404 of the control lever 40. Therefore, the FF lever 42 is rotated clockwise (FIG. 17) by the biasing force of the torsion spring 424. The transmission gears 421 and 422 mesh with the high-speed gear 353 and the FF gear 124, respectively. The rotational force of the motor 19 is transmitted to the right reel table 12 through the belt 195, the center pulley 35, the high-speed gear 353, the transmission gears 421 and 422, and the FF gear 124. As a result, the right reel table 12 is rotated counterclockwise (in FIG. 17) at high speed.

Figure 18:
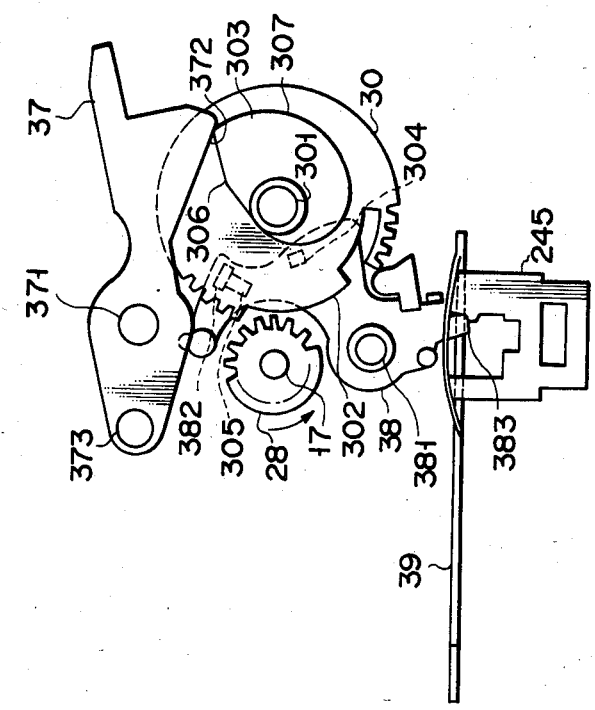

When the high-speed drive gear 30 is rotated by about ¾ revolution, the stopper 305 of the high-speed drive gear 30 is stopped by the lock portion 382 of the high-speed lock lever 38, as shown in FIG. 18. At the same time, the notch 302 of the high-speed drive gear 30 opposes the drive gear 28, thereby stopping rotation of the high-speed drive gear 30. In this condition, as may be apparent from FIG. 17, a sum of the biasing forces of the torsion spring 41 of the control lever 40 and a spring (not shown) for biasing the high-speed drive lever 37 is applied to the high-speed drive gear 30 through the cam 303. The shape of the cam 303 is designed such that the sum of forces acts to rotate the high-speed drive gear 30 clockwise (FIG. 18) in the same manner as the normal-speed drive gear 29 described with reference to FIG. 10. For this reason, the stopper 305 of the high-speed drive gear 30 is brought into tight contact with the lock portion 382 of the high-speed lock lever 38 so as to stably hold the high-speed drive gear 30 in the position shown in FIG. 18, thereby maintaining the fast forward mode.

When the STOP operation board 241 is operated in the fast forward mode, the FF operation board 245 is pivoted clockwise in FIG. 18 and returns to the nonoperative position. Therefore, the lock portion 382 of the high-speed lock lever 38 is separated from the stopper 305 of the high-speed drive gear 30 and is held in a position corresponding to the stopper 304. The high-speed drive gear 30 is rotated clockwise (FIG. 18) by the biasing force applied through the high-speed drive lever 37. The stopper 304 abuts against the lock portion 382 of the high-speed lock lever 38, so that the high-speed drive gear 30 is stopped and returns to the stop position. Then, the high-speed drive lever 37, the control lever 40 and the like return to the stop positions shown in FIG. 14, thereby setting the stop mode.

Assume that the REW operation board 243 is moved in the direction indicated by arrow A (FIG. 14) so as to set the cassette tape recorder in the rewind mode. The engaging portion 436 of the REW operation board 243 urges the end of the torsion spring 433 of the REW lever 43 upward (FIG. 14). In this condition, the control portion 437 of the REW lever 43 is stopped by the inner side of the second arm 405 of the control lever 40, and the REW lever 43 is not pivoted clockwise in FIG. 14. However, when the REW operation board 243 is sufficiently slid in the direction indicated by arrow A, the end of the torsion spring 433 is urged upward by the engaging portion 436. The REW operation board 243 is separated from the stopper 435 of the REW lever 43. As a result, the torsion spring 433 applies a biasing force on the REW lever 43 to pivot it clockwise (FIG. 14).

When the REW operation board 243 is moved so as to set the tape recorder in the rewind mode, as previously described with reference to FIG. 11, the lock portion 382 of the high-speed lock lever 38 is separated from the stopper 304 of the high-speed drive gear 30, and the high-speed drive gear 30 meshes with the drive gear 28. As previously described, the control lever 40 is pivoted clockwise (FIG. 19) through the high-speed drive lever 37. The second arm 405 of the control lever 40 is released from the control portion 437 of the REW lever 43. The REW lever 43 is pivoted clockwise (FIG. 19) by the biasing force applied by the torsion spring 433. The transmission gears 431 and 432 mesh with the high-speed gear 353 and the reverse-rotation gear 134, respectively. The rotational force of the motor 19 is then transmitted to the left reel table 13 through the belt 195, the center pulley 35, the high-speed gear 353, the transmission gears 431 and 432, the reverse-rotation gear 134, and the REW gear 133, so that the left reel table 13 is rotated clockwise (FIG. 19) at a high speed, thereby rewinding the tape.

When the high-speed drive gear 30 is rotated by about ¾ revolution, the high-speed drive gear 30 is stably held in the position shown in FIG. 18, thereby continuing tape rewinding.

When the STOP operation board 241 is moved to set the cassette tape recorder in the stop mode, while the rewind mode is set, the REW operation board 243 returns to its nonoperative position. Upon movement of the REW operation board 243, the high-speed lock lever 38 returns to its initial position. As a result, the high-speed drive gear 30 returns to its initial position, so that the high-speed drive lever 37, the control lever 40 and the like return to the positions for the stop mode as shown in FIG. 14, thereby setting the cassette tape recorder in the stop mode.

Figure 20:
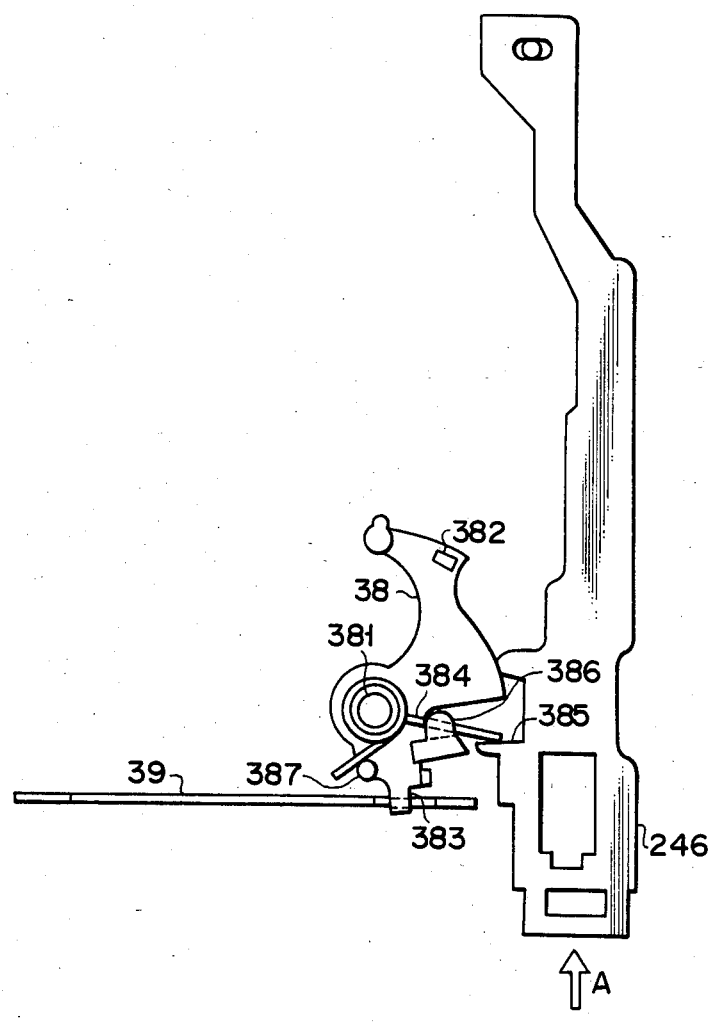

The operation of the PAUSE operation board 246 will now be described. As shown in FIG. 20, an engaging portion 385 is formed at one side of the PAUSE operation board 246 so as to be engageable with one end of a torsion spring 384 having a central portion which is wound around the pivot pin 381 of the high-speed lock lever 38. When the PAUSE operation board 246 is at the nonoperative position, the two ends of the torsion spring 384 are stopped by stoppers 386 and 387, respectively, formed in the high-speed lock lever 38. The torsion spring 384 does not apply any biasing force to the high-speed lock lever 38. The engaging portion 385 of the high-speed lock lever 38 is set in a position below (FIG. 20) the end of the torsion spring 384 which is stopped by the stopper 386 of the high-speed lock lever 38.

Now assume that the PAUSE operation board 246 is moved in the direction indicated by arrow A in FIG. 20, while the cassette tape recorder is set in the play mode as described with reference to FIG. 6. The engaging portion 385 of the PAUSE operation board 246 urges the end of the torsion spring 384 upward (FIG. 20). The high-speed lock lever 38 is then pivoted clockwise in FIG. 20. The lock portion 382 of the high-speed lock lever 38 is separated from the stopper 304 of the high-speed drive gear 30 in the manner as shown in FIG. 11. The high-speed drive gear 30 then meshes with the drive gear 28. It should be noted that the high-speed lock lever 38 is pivoted counterclockwise in FIG. 20 until the lock portion 382 reaches a path along which the stopper 305 of the high-speed drive gear 30 moves. However, since the PAUSE operation board 246 is sufficiently slid in the direction indicated by arrow A in FIG. 20, its engaging portion 385 urges the end of the torsion spring 384 upward. As a result, the PAUSE operation board 246 is separated from the stopper 386 of the high-speed lock lever 38. The torsion spring 384 applies a biasing force on the high-speed lock lever 38 to pivot it counterclockwise (FIG. 20). The high-speed lock lever 38 is held in the position shown in FIG. 11. The PAUSE operation board 246 is locked at the depressed or operative position by the push-push mechanism 26 (not shown in FIG. 20).

Figure 19:
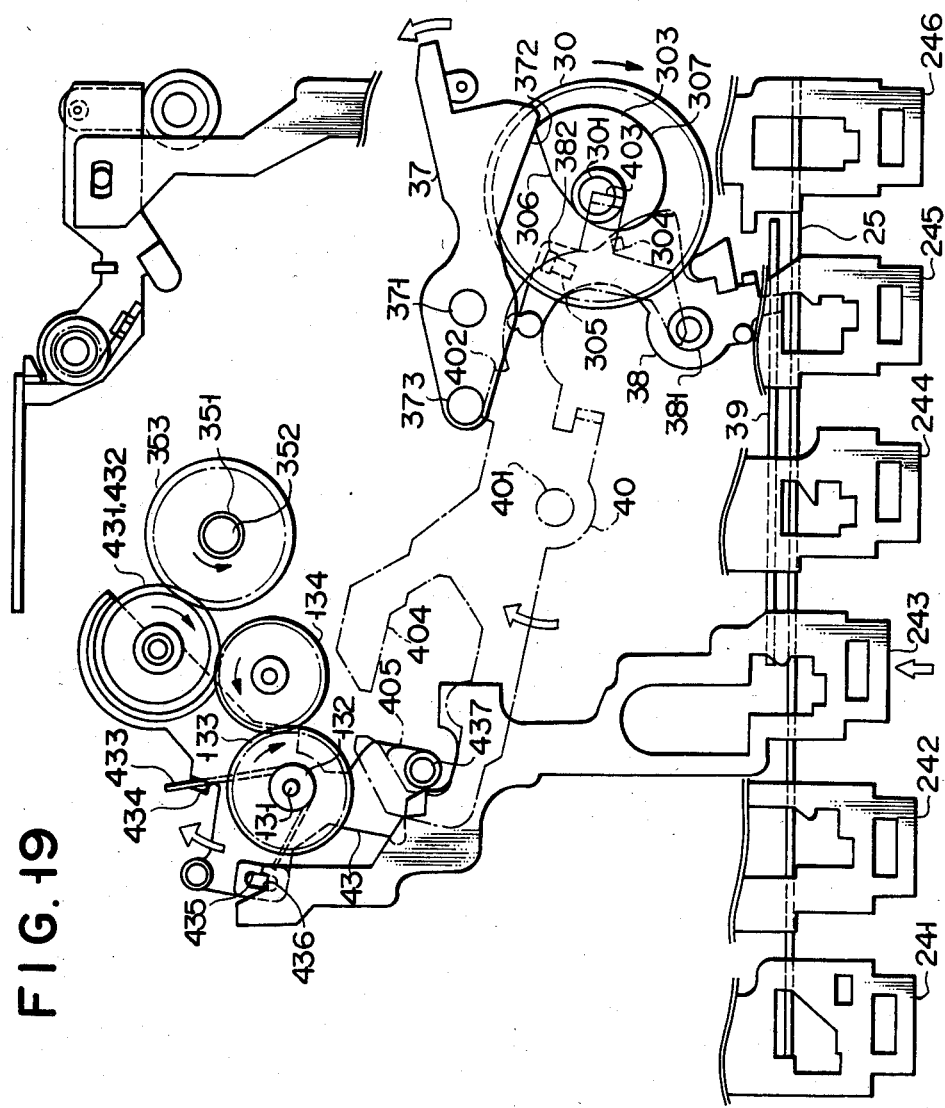
Figure 21:
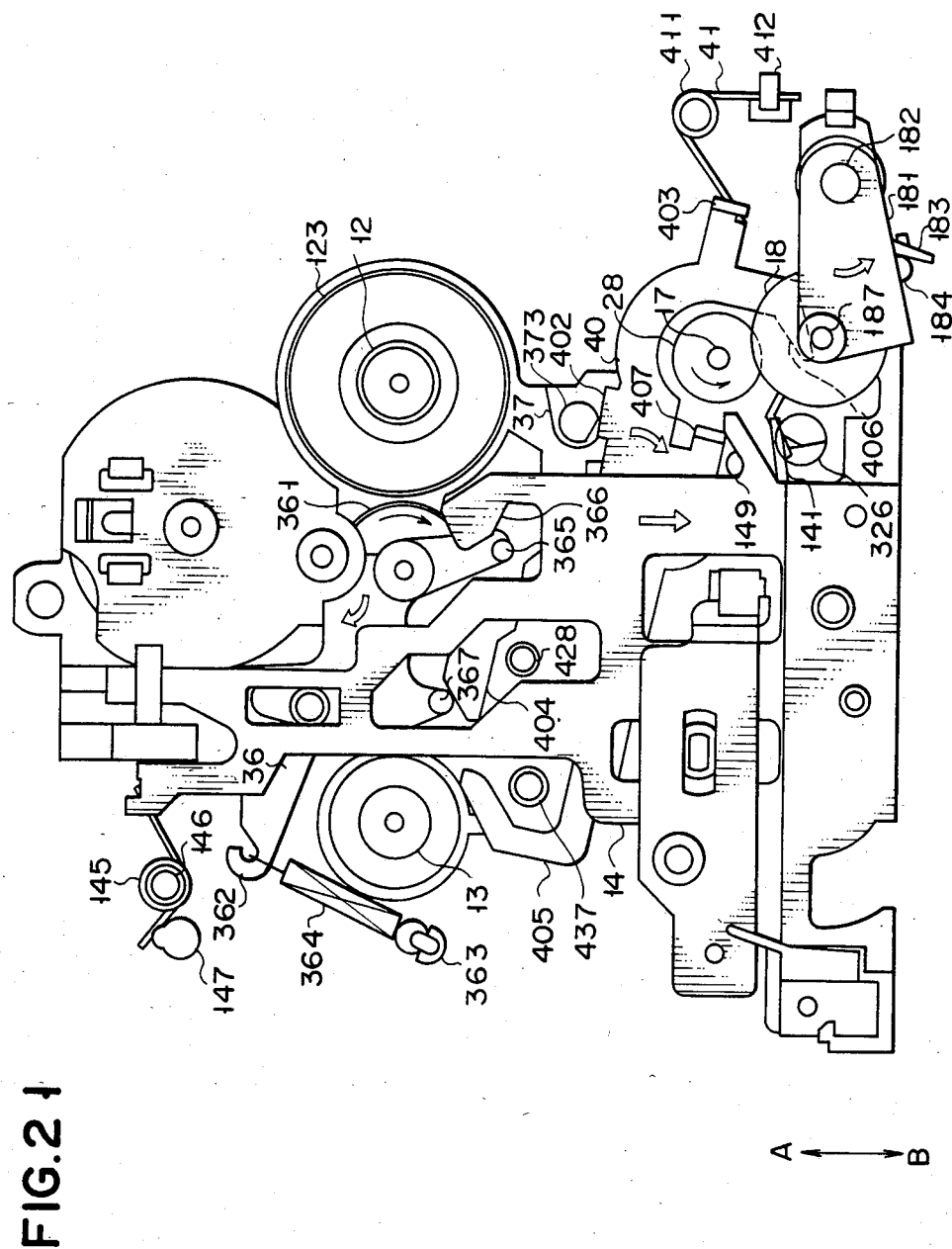

When the high-speed drive gear 30 is rotated clockwise (FIG. 11) by the rotating force of the drive gear 28, the control lever 40 is pivoted clockwise as shown in FIGS. 17 and 19. In this condition, as shown in FIG. 21, a third arm 406 is formed at one end of the control lever 40 so as to engage a rotating shaft 187 to rotatably support the pinch roller 18 with respect to the pinch lever 181. The control lever 40 also has a bent engaging piece 407 which can engage a projection 149 formed at one side of the head slider 14. An engaging portion 367 is formed in the normal-speed plate 36 so as to engage the outer side of the first arm 404.

In the play mode shown in FIG. 6, when the PAUSE operation board 246 is operated so as to pivot the control lever 40 clockwise as shown in FIG. 21, the third arm 406 and the bent engaging piece 407 of the control lever 40 urge the rotating shaft 187 of the pinch roller 18 and the projection 149 of the head slider 14, respectively. The pinch lever 181 is pivoted counterclockwise (FIG. 21) against the biasing force of the torsion spring 183, and the head slider 14 is moved downward (FIG. 21) against the biasing force of the torsion spring 141. The record/play head 15 returns to a position where it is brought into light contact with the magnetic tape. At the same time, the pinch roller 18 is separated from the capstan 17. Furthermore, the outer side surface of the first arm 404 of the control lever 40 urges the engaging portion 367 of the normal-speed plate 36. The normal-speed plate 36 is pivoted clockwise (FIG. 21) against the biasing force of the spring 364. The transmission gear 361 is separated from the normal-speed gear 123 of the right reel table 12. As a result, the right reel table 12 is stopped, thereby temporarily stopping tape travel.

In the pause mode, when the PAUSE operation board 246 is again moved in the direction indicated by arrow A in FIG. 20, it is released and returns to its nonoperative position. The high-speed lock lever 38 then returns to the initial position, so that the high-speed drive gear 30 returns to the position for the stop mode as previously described. Upon movement of the high-speed drive gear 30, the control lever 40 returns to the position shown in FIG. 6, thereby setting the cassette tape recorder in the play mode again.

The pause mode can be set during recording in the same manner as described above.

Figure 22:
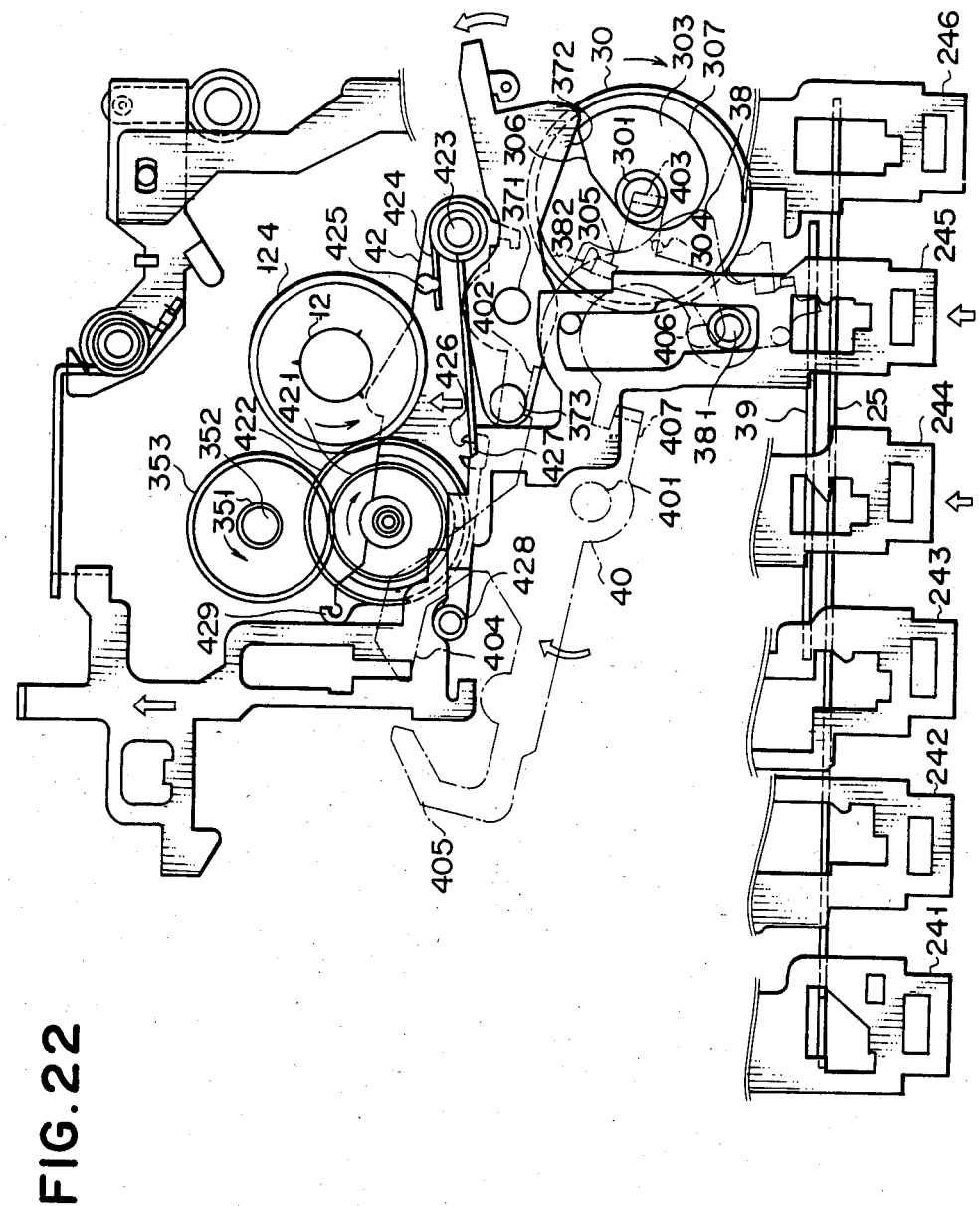

In the cassette tape recorder of the type described above, a combination of fast forward and play modes (to be referred to as a cue mode or cuing hereinafter) or a combination of rewind and play modes (to be referred to as a review mode or reviewing hereinafter) may be used by operating the PLAY operation board 244 and the FF operation board 245, or the PLAY operation board 244 and the REW operation board 243, respectively. Either pair of boards can be operated separately (i.e. the PLAY operation board can be operated first and then the FF or REW operation board can be operated) or simultaneously. First, cuing will be described. This mode is the same as a mode wherein the FF operation board 245 is operated in the play mode. The high-speed drive gear 30 is rotated with the FF operation board 245. Upon this operation, the control lever 40 is pivoted clockwise as shown in FIG. 22. In the same manner as described in the pause mode, the head slider 14 is urged downward by the control lever 40 so as to bring the record/play head 15 into light contact with the magnetic tape. The pinch roller 18 is separated from the capstan 17, and the transmission gear 361 is separated from the normal-speed gear 123 of the right reel table 12. In this condition, when the FF operation board 245 is operated, the FF lever 42 is pivoted clockwise to the position shown in FIG. 22. The transmission gears 421 and 422 mesh with the high-speed gear 353 and the FF gear 124, respectively. The right reel table 12 is rotated counterclockwise (FIG. 22) so that the tape is fast forwarded, thereby setting the cassette tape recorder in the cue mode.

The review mode will now be described. The review mode is the same as a mode wherein the REW operation board 243 is operated in the play mode. Upon movement of the REW operation board 243, the high-speed drive gear 30 is rotated. The control lever 40 is then pivoted clockwise in FIG. 23. In the same manner as in the pause mode, the control lever 40 urges the head slider 14 downward so as to bring the record/play head 15 into light contact with the magnetic tape, and the pinch roller 18 is separated from the capstan 17. At the same time, the transmission gear 361 is separated from the normal-speed gear 123 of the right reel table 12. In this case, when the REW operation board 243 is operated, the REW lever 43 is pivoted clockwise (FIG. 23) as previously described. The transmission gears 431 and 432 mesh with the high-speed gear 353 and the reverse-rotation gear 134, respectively. The left reel table 13 (not shown in FIG. 23) is rotated clockwise in FIG. 23, thereby setting the cassette tape recorder in the review mode.

Figure 24:
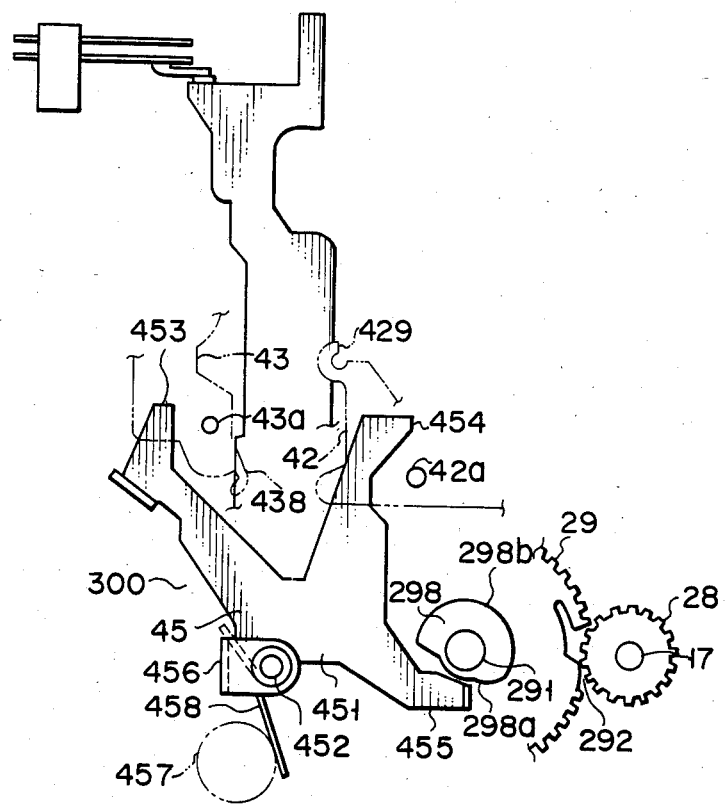

A control cam 298 is formed in the normal-speed drive gear 29, as shown in FIG. 24. The control cam 298 overlays the cam 293 of the normal-speed drive gear 29. The control cam 298 comprises a flat first portion 298a and an arcuated second portion 298b. A subchassis (not shown) is disposed parallel to the main chassis 11. A release lever 45 which constitutes a control mechanism 300 is pivotably supported on the subchassis. A proximal portion 451 of the release lever 45 is fitted around a pivot pin 452 extending from the subchassis. The release lever 45 has first to third extended portions 453 to 455 which extend from the proximal portion 451. The first extended portion 453 can engage an engaging portion 43a formed on the REW lever 43. The second extended portion 454 can engage an engaging portion 42a formed on the FF lever 42. The third extended portion 455 can engage the control cam 298 of the normal-speed drive gear 29. The release lever 45 is biased counterclockwise (FIG. 24) by a torsion spring 458 and can be pivoted up to the position shown in FIG. 24. The central portion of the torsion spring 458 is wound around the pivot pin 452, and the two ends thereof are stopped by a stopper 456 formed on the release lever 45 and a stopper 457 formed on the main chassis 11, respectively.

As previously described, when the stopper 294 of the normal-speed drive gear 29 is stopped by the lock portion 332 of the normal-speed lock lever 33, the first portion 298a of the control cam 298 opposes the third extended portion 455 of the release lever 45.

Figure 25:
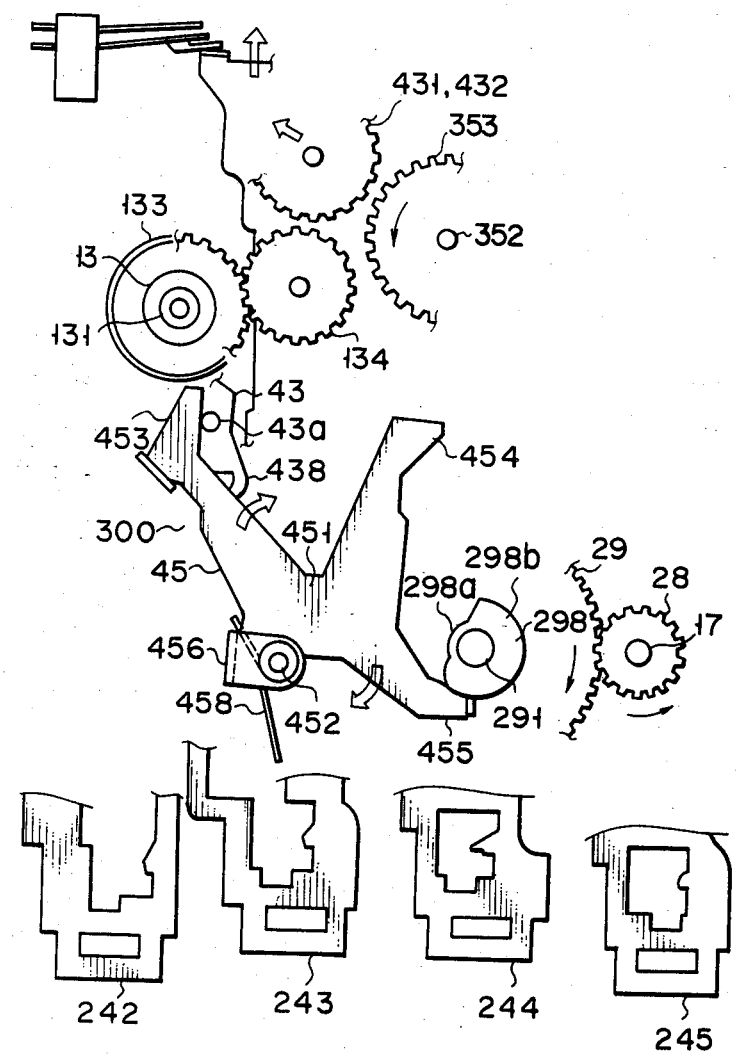

In this condition, when the REW operation board 243 is operated, the cassette tape recorder is set in the rewind mode as described with reference to FIG. 19. Now assume that the PLAY operation board 244 is operated in the rewind mode so as to set the cassette tape recorder in the review mode, as shown in FIG. 25. As previously described, upon operation of the PLAY operation board 244, the normal-speed drive gear 29 meshes with the drive gear 28 and is rotated clockwise in FIG. 25. The third extended portion 455 of the release lever 45 is urged by the second portion 298b of the cam 298 of the normal-speed drive gear 29. The release lever 45 is pivoted clockwise (FIG. 25) against the biasing force of the torsion spring 458. In this condition, the first extended portion 453 of the release lever 45 engages the engaging portion 43a of the REW lever 43 so as to pivot the REW lever 43 counterclockwise in FIG. 25. The transmission gears 431 and 432 are separated from the high-speed gear 353 and the reverse-rotation gear 134, respectively, so that the left reel table 13 is temporarily stopped.

Figure 23:
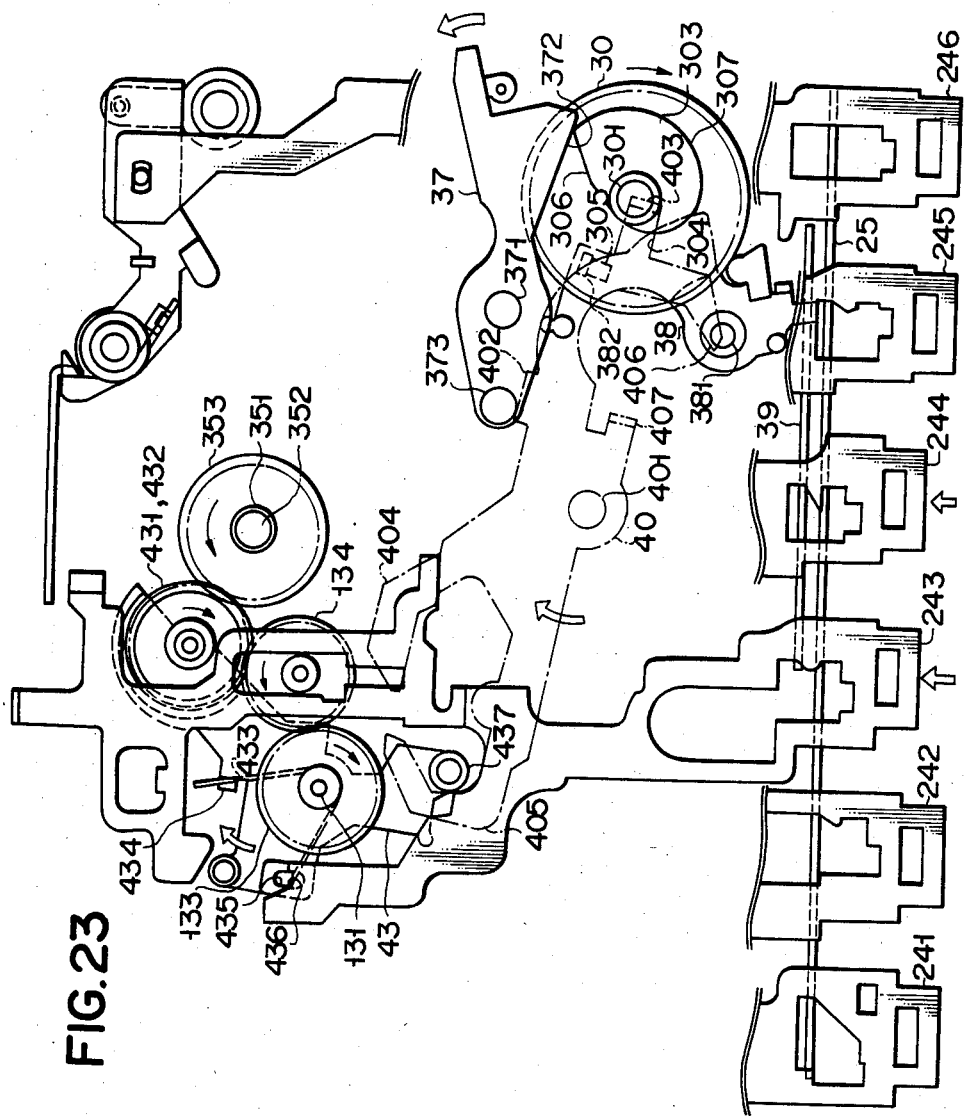

When the normal-speed drive gear 29 is rotated by about ¾ revolution and is held in the position shown in FIG. 10, the first portion 298a of the control cam 298 opposes the third extended portion 455 of the release lever 45 again. The release lever 45 is pivoted counterclockwise (FIG. 25) by the biasing force of the torsion spring 458 and returns to the initial position. The first extended portion 453 of the release lever 45 is separated from the engaging portion 43a of the REW lever 43. The REW lever 43 is pivoted clockwise (FIG. 25), so that the transmission gears 431 and 432 mesh with the high-speed gear 353 and the reverse-rotation gear 134, respectively. The left reel table 13 is driven again. Upon rotation of the normal-speed drive gear 29, the head slider 14, the pinch lever 181, the normal-speed plate 36 and so on tend to move to set the cassette tape recorder in the play mode. However, the control lever 40 regulates movement of these members, as shown in FIG. 23. As a result, the cassette tape recorder is set in the review mode.

If the operator wishes to perform cuing in the fast forward mode set by operating the FF operation board 245, he depresses the PLAY button corresponding to the PLAY operation board 244, thereby setting the tape recorder in the cue mode in the same manner as in the review mode. However, in this case, when the release lever 45 is pivoted clockwise in FIG. 25, the second extended portion 454 of the release lever 45 engages the engaging portion 42a of the FF lever 42, so that the FF lever 42 is pivoted counterclockwise in FIG. 17. As a result, the transmission gears 421 and 422 are separated from the high-speed gear 353 and the FF gear 124, respectively, thereby temporarily stopping the right reel table 12.

When the normal-speed drive gear 29 is held in the position shown in FIG. 10, the release lever 45 and then the FF lever 42 return to their initial positions, respectively. The transmission gears 421 and 422 mesh with the high-speed gear 353 and the FF gear 124, respectively, thereby rotating the right reel table 12. In this condition, the head slider 14, the pinch lever 81, the normal-speed plate 36 and so on are held in position by the control lever 40. As a result, cuing is performed.

In the fast forward or rewind mode, when the PLAY operation board 244 is operated, the release lever 45 interlocked with the normal-speed drive gear 29 does not transmit the rotational force to either the left or right reel table 12 or 13, thereby decreasing a load imposed on the motor 19, and hence decreasing power consumption. In particular, when the PLAY operation board 244 is operated and the normal-speed drive gear 29 is rotated, the normal-speed drive lever 32 is pivoted. The head slider 14 and the pinch lever 181 are moved to predetermined positions. The driving force applied to the normal-speed drive gear 29 is required to be greater than that applied to the high-speed drive gear 30. In other words, a load imposed on the motor 19 so as to rotate the normal-speed drive gear 29 is greater than that imposed on the motor 19 so as to rotate the high-speed drive gear 30. When the PLAY operation board 244 is operated in the fast forward or rewind mode, the rotational force of the motor 19 is not transmitted by the release lever 45 to either the right reel table 12 or the left reel table 13 while the normal-speed drive gear 29 is being rotated through a given angle. As a result, the load imposed on the motor 19 to drive the right reel table 12 or the left reel table 13 is eliminated. As a result, power consumption is decreased, which is highly desirable in a battery-operated cassette tape recorder.

In the conventional cassette tape recorder wherein the release lever 45 is not provided, if high-speed tape travel changes to cuing or reviewing, the motor 19 drives the normal-speed drive gear 29 and also drives the right reel table 12 or the left reel table 13 at a high speed. As a result, the motor has a heavy load, resulting in high power consumption. In the conventional battery-operated cassette tape recorder, the rotating torque of the motor 19 is satisfied until the voltage of the battery is decreased to 70% of the rated voltage. Thereafter, the motor 19 stops when high-speed tape travel changes to cuing or reviewing, which is inconvenient.

However, according to the present invention, the release lever 45 is used to stop the right reel table 12 or the left reel table 13, thereby stopping tape travel. High-speed tape travel can change to cuing or reviewing until the battery voltage is decreased to about 50% of its rated voltage. Thus, the present invention is highly suitable for a battery-operated portable cassette tape recorder.

What is claimed is:

1. A tape recorder comprising:
   a motor;
   reel tables on which reel hubs with a tape wound thereon are mounted;
   first operating members for driving the tape at a low speed and second operating members for driving the tape at a high speed;
   a high-speed drive mechanism interlocking with said second operating members, said high-speed drive mechanism being adapted to be held in a first state during an operating state of said second operating members so as to transmit a rotational force of said motor to said reel tables, and being adapted to be held in a second state during a nonoperating state of said second operating members so as not to transmit the rotational force of said motor to said reel tables;
   a low-speed drive mechanism interlocking with said first operating members, said low-speed driving mechanism being brought to an operating state by the rotational force of said motor so as to transmit the rotational force thereof to said reel tables, thereby driving the tape at the low speed; and
   a control mechanism for holding said high-speed drive mechanism in the second state while said low-speed drive mechanism changes from a nonoperating state to the operating state;
   whereby a load imposed on said motor is decreased when said first operating members, are operated while the tape is driven at the high speed.

2. A tape recorder according to claim 1, wherein said low-speed drive mechanism comprises:
   a head;
   a head slider on which said head is mounted, said head slider being movable between a first position where said head is brought into contact with the tape and a second position where said head is separated from the tape; and a first rotary body having a cam, said first rotary body interlocking with said first operating members so as to receive the rotational force from said motor;

whereby said head slider is moved from the second position to the first position so as to follow movement of said cam of said first rotary body.

3. A tape recorder according to claim 2, wherein said control mechanism comprises:

a control cam formed in said first rotary body; and a release lever driven to follow said control cam while said head slider is moved from the second position to the first position, thereby setting said high-speed drive mechanism in the second state.

4. A tape recorder according to claim 3, wherein said low-speed drive mechanism comprises:

a second rotary body rotatable together with said reel table which serves as a takeup reel at the normal speed;

a third rotary body driven by the rotational force of said motor independent of tape travel; and a normal-speed plate rotatably supporting said third rotary body and interlocking with said head slider, said normal-speed plate being adapted to be held in a position where said third rotary body disengages from said second rotary body when said head slider is set in the second position and in a position where said third rotary body engages said second rotary body when said head slider is set in the first position.

5. A tape recorder according to claim 4, wherein said low-speed drive mechanism comprises:

a normal-speed drive lever driven upon movement of said cam of said first rotary body; and a first elastic member for transmitting a driving force of said normal-speed drive lever to said head slider so as to move said head slider from the second position to the first position.

6. A tape recorder according to claim 5, wherein said low-speed drive mechanism comprises:

a fourth rotary body receiving the rotational force of said motor and rotated independent of the tape travel, said fourth rotary body being engaged with said first rotary body so as to transmit the rotational force to said first rotary body;

a notch formed in part of said first rotary body, said notch being adapted to disengage from said fourth rotary body; and a normal-speed lock lever for preventing rotation of said first rotary body when said notch of said first rotary body opposes said fourth rotary body and for allowing the rotation of said first rotary body upon operation of said first operating members;

whereby a biasing force of said first elastic member is applied to said first rotary body through said normal-speed drive lever when said notch of said first rotary body opposes said fourth rotary body, so that said first rotary body is biased so as to rotate in one direction.

7. A tape recorder, according to claim 6, wherein said high-speed drive mechanism comprises:

a fifth rotary body rotatable together with said reel table which serves as a takeup reel in fast forwarding;

a sixth rotary body receiving the rotational force from said motor and rotated independent of the tape travel;

an FF lever interlocking with said second operating member which serves as an FF operating member, said FF lever being adapted to be selectively held in a first position where said fifth rotary body disengages from said sixth rotary body when said second operating member is set in the nonoperating state and in a second position where said fifth rotary body engages said sixth rotary body when said operating member is set in the operating state;

a seventh rotary body rotatable together with said reel table which serves as a takeup reel in rewinding;

an eighth rotary body receiving the rotational force of said motor and rotated independent of the tape travel; and a REW lever interlocking with said second operating member which serves as a rewinding operating member, said REW lever being adapted to be held in a first position where said seventh rotary body disengages from said eighth rotary body when said rewinding operating member is set in the nonoperating state and in a second position where said seventh rotary body engages said eighth rotary body when said rewinding operating member is set in the operating state.

8. A tape recorder according to claim 7, wherein said release lever comprises:

a first extended portion adapted to engage said REW lever;

a second extended portion adapted to engage said FF lever; and a third extended portion adapted to engage said control cam of said first rotary body;

whereby said third extended portion is pivoted in one direction upon movement of said control cam, and said first and second extended portions engage with said REW lever and said FF lever, respectively, thereby holding said REW lever and the FF lever in the first positions.

9. A tape recorder according to claim 8, wherein said high-speed drive mechanism comprises:

a ninth rotary body having a cam so as to transmit the rotational force of said motor upon operation of said second operating members; and a control lever driven upon movement of said cam of said ninth rotary body so as to move said REW lever and said FF lever from the first positions to the second positions, respectively.

10. A tape recorder according to claim 9, wherein said control lever has an engaging portion engaging said head slider when said low-speed drive mechanism is operated and said second operating members are operated, whereby said head slider is slightly moved from the first position to the second position so as to set said normal-speed plate in a position where said third rotary body disengages from said second rotary body and to drive the tape at the high speed while said head slightly contacts said tape.

11. A tape recorder according to claim 10, wherein said high-speed drive mechanism comprises:

a second elastic member disposed in said FF lever, said second elastic member being adapted not to apply a biasing force to said FF lever when said FF lever is set in the first position and adapted to apply the biasing force to said FF lever so as to move said FF lever to the second position upon operation of said second operating member as said fast forwarding operating member, and a third elastic member disposed in said REW lever, said third elastic member being adapted not to apply a biasing force to said REW lever when said REW lever is set in the first position and adapted to apply the biasing force to said REW lever so as to move said REW lever to the second position upon operation of said second operating member as said rewinding operating member;

whereby said FF lever and said REW lever are moved to the second positions by the biasing forces of said second and third elastic members when said control lever is driven.

* * * * *